United States Patent [19]

Giammarco et al.

[11] 3,962,404
[45] June 8, 1976

[54] PROCESS FOR REGENERATING ABSORBENT SOLUTIONS USED FOR REMOVING GASEOUS IMPURITIES FROM GASEOUS MIXTURES BY STRIPPING WITH STEAM

[76] Inventors: Giuseppe Giammarco; Paolo Giammarco, both of San Marco n.3242, Piazzale Morolin, Venice, Italy

[22] Filed: Feb. 19, 1974

[21] Appl. No.: 443,573

[30] Foreign Application Priority Data
May 21, 1973 Italy .................................. 68474/73
Feb. 16, 1973 Italy .................................. 67372/73

[52] U.S. Cl. .................................. 423/222; 55/36; 55/37; 55/38; 203/42; 203/96; 423/223; 423/226; 423/227; 423/229; 423/232; 423/236; 423/242; 423/243
[51] Int. Cl.² .................... C01B 17/16; C01B 31/20
[58] Field of Search .................... 203/42, 39, 43–46, 203/71, 73, 75–78; 55/32, 31, 37, 49, 36, 38, 46, 40–44; 159/31, 2 MS, 95, 96; 423/226–229, 232–236, 242, 243, 222, 223

[56] References Cited
UNITED STATES PATENTS

| | | | |
|---|---|---|---|
| 2,437,288 | 3/1948 | Anderson | 55/32 |
| 3,532,152 | 10/1970 | Cartinhour | 159/2 MS |
| 3,563,695 | 2/1971 | Benson | 423/233 |
| 3,642,430 | 2/1972 | Benson | 423/228 |
| 3,685,960 | 8/1972 | Benson | 423/229 |
| 3,714,327 | 1/1973 | Giammarco | 423/220 |
| 3,851,041 | 11/1974 | Eichmeyer | 423/228 |

*Primary Examiner*—Jack Sofer
*Assistant Examiner*—Frank Sever
*Attorney, Agent, or Firm*—Sughrue, Rothwell, Mion, Zinn & Macpeak

[57] ABSTRACT

A process for regenerating absorbent solutions used for removing gaseous impurities such as $CO_2$, $H_2S$, $HCN$, $SO_2$ and other acidic gases from gaseous mixtures by stripping with steam, which comprises a. dividing the solution to be regenerated into a principal and a secondary fraction ($p$ and $s$) and regenerating these fractions separately from each other in a principal and a secondary regeneration column (P and S), the principal regeneration column being operated at a pressure of at least about 0.2 to 0.5 atm above the pressure of the secondary regeneration column, b. regenerating the principal fraction in the principal regeneration column by heat which is fed from outside into the lower part of the column, c. regenerating the secondary fraction in the secondary regeneration column by heat which has been removed from the regenerated solution leaving the principal regeneration column and d. passing the regenerated fractions to the absorber.

27 Claims, 6 Drawing Figures

PROCESS FOR REGENERATING ABSORBENT SOLUTIONS USED FOR REMOVING GASEOUS IMPURITIES FROM GASEOUS MIXTURES BY STRIPPING WITH STEAM

BACKGROUND OF THE INVENTION

1. Field of the Invention

The invention relates to a process for regenerating absorbent solutions used for removing gaseous impurities from gaseous mixtures by stripping with steam. The invention relates in particular to the regeneration of absorbent solutions used for removing $CO_2$, $H_2S$, HCN, $SO_2$ and other acidic gases from gaseous mixtures. The process of the invention may furthermore be applied to other cyclic purifying processes for removing acetylene, methane, ethane, benzene, toluene and other hydrocarbons as well as other gaseous impurities as far as the known absorbent liquids suited for this purpose can be regenerated by stripping with steam.

2. Description of the Prior Art

In the known cyclic purifying processes, an absorbent solution or an absorbent liquid in general is circulated between an absorption phase and a regeneration phase. In the absorption phase the absorbent solution is contacted with the gaseous mixture to be purified, the gaseous impurities contained therein being removed. in the regeneration phase the abosrbent solution is treated with steam in order to desorb the impurities previously absorbed.

The best-known purifying processes of this kind concern the absorption of gaseous impurities such as $CO_2$, $H_2S$, HCN, $SO_2$ and/or similar gases by using alkaline aqueous solutions. Examples of absorbent solutions are alkali carbonate solutions which are optionally activated by adding $As_2O_3$, glycine or other amino acids or by adding ethanol amines such as monoethanol amine, diethanol amine or similar compounds, or solutions of alkali metal salts of amino acids, ethanol amine solutions such as solutions of monoethanol amine, diethanol amine, triethanol amine or similar compounds such as solutions of alkali phosphates, alkali phenates, alkali borates and similar compounds. The absorption of $SO_2$ is carried out in particular by using alkali sulfite/alkali bisulfite solutions.

The afore-mentioned purifying processes can be carried out at low temperatures, i.e., at about normal temperature, or at elevated temperatures. In the case of the so-called "conventional cycle" (see Kohl and Riesenfeld, "Gas Purification" (1960) p. 24), the absorption is carried out at temperatures near ambient temperature, and the regeneration at the boiling temperature of the absorbent solution and at pressures near atmospheric pressure. In the case of this conventional cycle, a heat exchanger is provided in addition to the absorption and regeneration device, by means of which the spent absorbent solution is heated by the regenerated solution. Furthermore a cooler is provided and arranged before the absorption phase.

In particular, when removing $CO_2$ the absorption can also be carried out in heat, i.e., at temperatures of from about 90° to 120°C, which is near the regeneration temperature. In this case the so-called "isothermic cycle" or "optimal cycle" is used (see Kohl and Risenfeld, loc. cit. p. 134,) the use of the heat exchanger employed in the conventional cycle superfluous. Although this means a facilitation, the purification of the gaseous mixture to the values necessary in modern, large-scale practice is difficult at the high absorption temperature and generally necessitates a purifying cycle consisting of two steps (see U.S. Pat. No. 1,971,798).

All purifying processes mentioned show the disadvantage of a low thermal efficiency. In the processes best known and best capable of being improved for removing $CO_2$, the heat consumption is about 1000 to 1300 kcal/m³ of $CO_2$. This heat consumption appears the higher the more it is considered that the heat consumption in cycles involving regeneration with air is only about 450 to 600 kcal/m³ of $CO_2$, even in two-stage plants with a purification degree of from about 0.02 to 0.05 percent of $CO_2$).

The regeneration cycle involving air and other desorbent inert gases is carried out on large scale such that the absorbent solution leaving the absorber and having a temperature of from about 75° to 80°C is gradually heated by external heat to temperatures of from about 85° to 90°C and subsequently passed to the regenerator in countercurrent with the desorbent gas. The absorbent solution is regenerated and simultaneously cooled to temperatures of from 70° to 75°C. Finally the absorbent solution is returned to the absorber to complete the cycle.

SUMMARY OF THE INVENTION

It is an object of the invention to reduce the heat consumption of the cyclic purifying processes including regeneration with steam as far as possible to the heat consumption of the processes including regeneration with air. It is a further object of the invention to reduce the extent of the thermal devices necessary for the performance of the cycle, in particular of the reboiler, and to also considerably diminish or practically completely remove the cooler for the $CO_2$ or the other gaseous impurities absorbed by the regenerator. According to the process of the invention, the absorption of the gaseous impurities can be carried out in the cold with an improved conventional cycle. This process obviates the heat exchanger between the spent and regenerated solution which is one of the most complicated devices in the conventional cycle.

Numerous experiments have been carried out in order to solve the afore-mentioned task and determine the main sources of the loss of heat. For this purpose those processes for removing $CO_2$ which are most important in practice have been taken into consideration. The following sources of loss have been found:

I. When the absorbent solution is fed to the top of the regenerator at elevated temperatures (of from about 95° to 120°C) it is subjected to a first loss of heat during the expansion to practically the atmospheric pressure of the regenerator by discharging heat, this loss of heat being caused by the considerable, practically non-used development of steam during the desorption of $CO_2$ and/or $H_2S$ (and/or similar gaseous impurities). This steam is deduced from the top of the regenerator via the cooler.

II. A further loss of heat is based on the fact that the solution which is fed to the top of the regenerator at the aforementioned high temperatures cannot absorb the steam accompanying the gaseous impurities, due to its high temperature. Consequently, this excess steam is discharged to the exterior via the cooler, its heat content not being used.

III. A further loss of heat is based on the fact that the heat content of the absorbent solution leaving the regenerator at its boiling temperature is lost in the cooling device. In the case of the conventional cycle this loss of heat occurs in the cooler, whereas in the case of the isothermic cycle, the heat of the regenerated solution (after having passed the absorber by causing an increase in temperature which means a disadvantage) is finally led to the top of the regenerator and discharged to the exterior via the cooler.

The subject-matter of the invention is a process for regenerating absorbent solutions used for removing gaseous impurities from gaseous mixtures, by stripping with steam, which involves characterized in that a. the solution to be regenerated is divided into a principal and a secondary fraction ($p$ and $s$) and these fractions are regenerated separately from each other in a principal and a secondary regeneration solumn (P and S), the principal regeneration column being operated at a pressure of at least about 0.2 to 0.5 atm. above the pressure of the secondary regeneration column, b. the principal fraction is regenerated in the principal regeneration column by heat which is supplied from outside into the lower part of the column, c. the secondary fraction is regenerated in the secondary regeneration column by heat which has been released from the regenerated solution leaving the principal regeneration column and d. the regenerated fractions are passed to the absorber.

The difference in pressure between the two regeneration columns must in any case be sufficient to allow the heat necessary for the regeneration to be transferred from the principal regeneration column to the secondary regeneration column. The pressure in the principal regeneration column is controlled so to prevent a cooling of the principal fraction of the absorbent solution to be regenerated, during the reduction of pressure or expansion which occurs upon transference from the absorption step to the regeneration step, by discharging heat. According to the process of the invention, the excess stream leaving at the top of the principal regeneration column is absorbed and thus its heat content is retained. The most favorable conditions are achieved by adjusting the pressure ratios such that depending on the regeneration degree in the principal regeneration column a temperature drop of the absorbent solution between the inlet and outlet of from about 10° to 35°C is obtained. This causes both the heat whose loss has been avoided during the expansion and the heat of the recovered excess steam to be substantially recovered, the temperature of the absorbent solution leaving the principal regeneration column being increased.

The heat used for the regeneration of the secondary fraction is transferred by heat-exchange or by similar arrangements. The regenerated solution of the principal fraction is preferably expanded to the pressure of the secondary absorption column a vapor stream being obtained which is fed to the bottom of the secondary regeneration column. The regenerated fractions are subsequently fed to the absorber together or separately.

Furthermore, it is possible to feed the secondary fraction $s$ by means of a pump from the outlet of the secondary regeneration column S to the principal regeneration column P at a point between the top of the column and the bottom of the column and to mix it there with the solution streaming downwards to complete the regeneration of the secondary fraction. Subsequently, the thus regenerated combined solution is fed to the absorption step.

According to a preferred embodiment of the process of the invention, the solution to be regenerated is completely fed to the top of the principal regeneration column P. After having passed some of the upper part of this column, the solution is divided into the fractions $p$ and $s$. Subsequently, the fraction $p$ continues to run downwards in the column P, while the fraction $s$ is removed from the column P and fed to the top of the secondary regeneration column S.

The two afore-mentioned possibilities, i.e. dividing the fractions or the embodiment according to which the fraction $s$ is returned to the column P, yield practically the same results and can both be applied in the process of the invention. For the sake of simplicity, reference is particularly made to the embodiment according to which the solution is divided from the beginning of the regeneration and the secondary fraction $s$ is not recycled to the column P. In most cases no reference is made to the embodiment according to which the solution $s$ is returned to the column P by means of a pump. As hereinafter stated in further detail, the solution can be divided into the fractions in the absorption step.

Experiments and tests are now described which have been carried out in order to find oout the reasons for the above-mentioned losses of heat and in order to provide suitable arrangements for improving the yield of heat when regenerating with steam.

1. According to the conventional process for regenerating with steam, the spent solution is fed to the regenerator at temperatures of from about 95° to 120°C. The solution leaves the absorber already being heated (isothermic or optimal cycle) or the absorption is carried out in the cold and the solution is subsequently preheated by means of the heat exchanger (conventional cycle).

This leads to a considerable loss of heat which does not occur in the case of the regeneration cycle involving air and which is based on the fact that at the temperatures mentioned the solution expands to the atmospheric pressure prevailing in the regenerator ("flash") and develops a considerable amount of steam which has not time and possibility to desorb the $CO_2$, $H_2S$ and/or similar absorbed gaseous impurities. This steam is used only to a little extent and is discharged via the cooler to the exterior.

The results of the experiments carried out in respect of this problem are stated in Tables I, II and III.

Table I
Absorbent solution: 250 g/liter $K_2O$ and 50 g/liter glycine

| original carbonation degree, % | initial temperature, °C | temperature after flash, °C | carbonation degree after flash, % | Vol. of $CO_2$ liberated, $m^3$ $CO_2$/$m^3$ solution | heat developed, Kcal | maximum heat consumption, Kcal/$Nm^3$ $CO_2$ |
|---|---|---|---|---|---|---|
| 65 | 95 | 90.5 | 52 | 6.2 | 4,190 | 167 |

-continued

| | | | | | | |
|---|---|---|---|---|---|---|
| 65 | 100 | 91.5 | 48.5 | 7.9 | 7,900 | 316 |
| 65 | 110 | 94 | 43 | 10.45 | 14,840 | 594 |
| 65 | 120 | 94.5 | 38 | 12.90 | 23,600 | 945 |
| 65 | 130 | 95.5 | 34 | 14.80 | 32,000 | 1,270 |

Table II
Absorbent solution: 200 g/liter $K_2O$ and 140 g/liter $As_2O_3$

| | | | | | | |
|---|---|---|---|---|---|---|
| 65 | 95 | 92 | 59 | 3.57 | 2,800 | 112 |
| 65 | 100 | 94.5 | 57 | 4.76 | 5,100 | 204 |
| 65 | 110 | 96 | 52.7 | 7.44 | 13,000 | 520 |
| 65 | 120 | 97 | 49 | 9.50 | 21,400 | 855 |
| 65 | 130 | 98 | 45.5 | 11.60 | 29,800 | 1,194 |

Table III
Absorbent solution: 250 g/liter $K_2O$

| | | | | | | |
|---|---|---|---|---|---|---|
| 75 | 95 | 93.5 | 74 | 0.60 | 1,395 | 09 56 |
| 75 | 100 | 95 | 72 | 1.78 | 4,650 | 186 |
| 75 | 110 | 97 | 68.5 | 3.87 | 12,100 | 483 |
| 75 | 120 | 97.5 | 66 | 5.35 | 20,900 | 835 |
| 75 | 130 | 98 | 64 | 6.65 | 29,800 | 1,190 |

The results stated in Table I relate to the experiments in respect to the absorption of $CO_2$ by means of potassium carbonate solution which has been activated with glycine (250 g/l of $K_2O$ and 50 g/l of glycine). The $CO_2$ absorption is an example of the absorption of other gaseous impurities which can be removed according to the process of the invention. At the beginning the absorbent solution has a carbonation degree of 65 percent (see column 1). The expansion is carried out until atmospheric pressure is reached. The temperature prior to the expansion is stated in column 2. Due to the expansion the absorbent solution cools down to the temperature stated in column 3. The carbonation degree then has the values as stated in column 4. Column 5 shows the $CO_2$ amount in $m^3$ $CO_2/m^3$ of solution. During expansion the quantity of heat stated in column 6 is released. Column 7 shows the average maximal heat consumption of the purifying cycle due to the expansion stated, per purifying cycle an average absorption of about 25 parts by volume of $CO_2$/1 part by volume of solution being assumed.

Similar results are achieved when using as activator other amino acids or substances generally stated in DT-AS 1 148 036 instead of glycine.

The results of similar experiments which have been carried out with $As_2O_3$ activated potassium carbonate solutions are stated in Table II. Table III shows the corresponding results achieved with a simple potassium carbonate solution.

Similar results have been achieved with other absorbent solutions and other gaseous impurities.

The afore-mentioned experiments show that the loss of heat during expansion increases considerably when the initial temperature of the solution increases. In the case of temperatures of from 115° to 118°C which generally occur in the isothermic cycle, an unacceptably high heat consumption of from about 800 to 850 kcal/$m^3$ of $CO_2$ results, which is sufficient to explain the difference in heat consumption between the isothermic cycle with regeneration involving steam and the cycle with regeneration involving air, the latter also being an isothermic regeneration, however, with considerably lower temperatures.

When the temperatures decrease the loss of heat also decreases during expansion to a considerably extent. As Table I shows, the heat consumption at temperatures of from about 85° to 90°C becomes acceptable in practice and is completely removed when the temperature is reduced to the boiling point of the solution (70°C). At this temperature the partial pressures of $CO_2$ and/or $H_2S$ and of $H_2O$ together reach atmospheric pressure or a pressure near atmospheric pressure at which the regenerator is operated.

The experimental results show that the development of steam and $CO_2$ depends on the driving forces (and thus on the boiling temperature of the spent absorbent solution which is heavily influenced by the carbonation degree of the absorbent solution) and an the corresponding transfer units. In the case of temperatures of above 100°C the heat developed during expansion is mainly used for steam development. The steam develops primarily in dependence on the basic physical process which takes place very quickly whereas the $CO_2$ development takes place considerably more slowly which is due to the slow chemical decomposition reaction of the bicarbonate or carbamate. This leads to the fact that the steam developed by the expansion can be used only to a small extent for the regeneration.

1a. In the process of the invention the afore-mentioned loss of heat is removed or recovered in that the pressure of the regenerator is correspondingly increased. Thus, it is achieved that the actual temperature of the spent absorbent solution approaches the boiling temperature of the absorbent solution or reaches the boiling temperature which leads to the reduction or termination of the steam development during expansion. In practice it is sufficient to approach the two temperatures to each other such that the loss of heat is acceptable. From Table I it can, for example, be seen that the absorbent solution activated with glycine and having a carbonation degree of about 65 percent and a temperature of about 110°C necessitates a pressure of about 1.8 atm in the regenerator in order to achieve a loss of heat during expansion which corresponds to the loss of heat to which the same solution is subjected at an initial temperature of about 90°C when expanding to atmospheric pressure.

2. A further loss of heat in the known process for regenerating absorbent solutions with steam is due to the fact that the absorbent solution is fed into the regenerator at high temperatures and, being heated, can thus not absorb and utilize the steam which accompanies the desorbed gases $CO_2$, $H_2S$ and/or the other gaseous impurities coming from the top of the regenerator.

Figure 1:
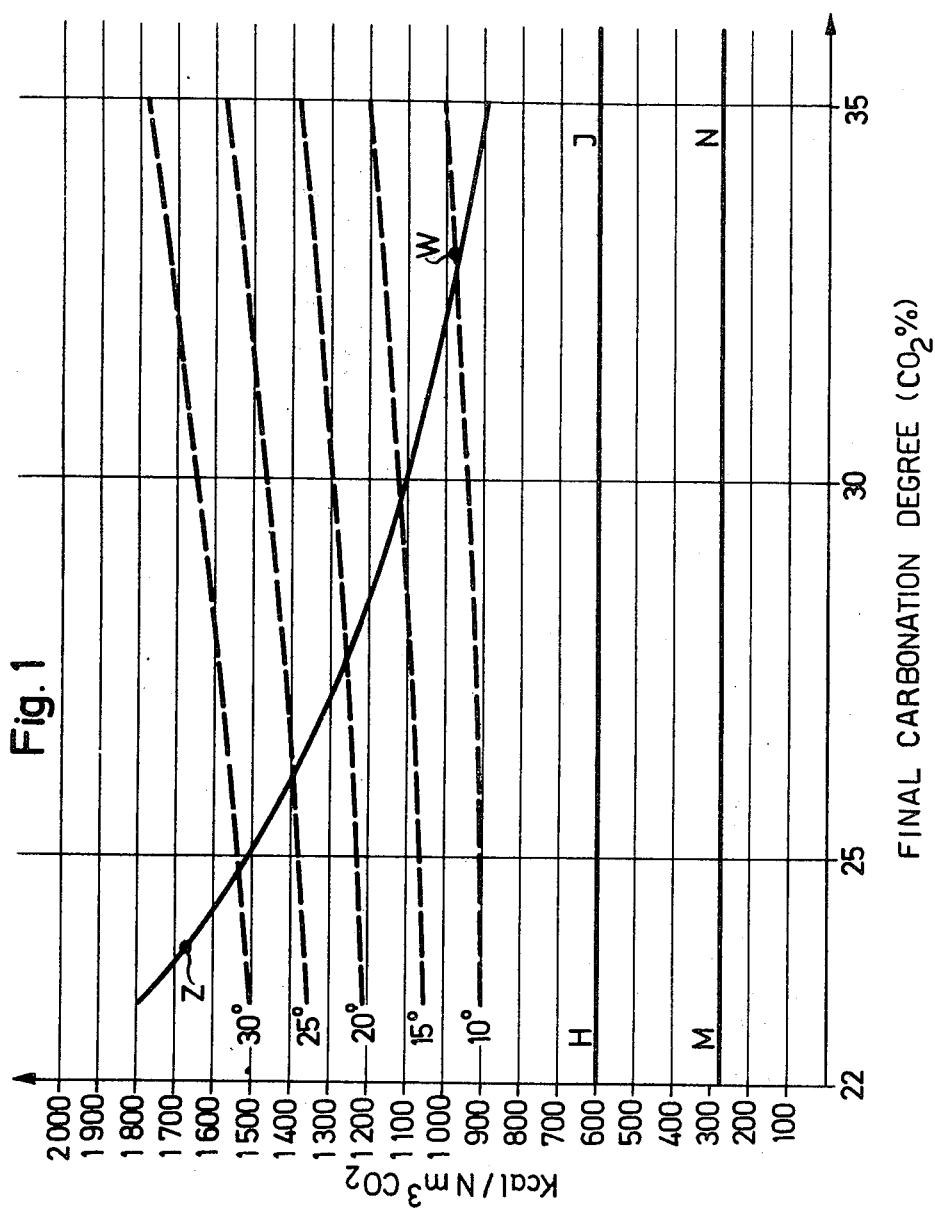
FIG. 1, shows a plot of heat loss versus degree of carbonation for an absorbent solution activated with glycine.

The above-mentioned loss of heat is defined and evaluated by means of FIG. I. The diagram of FIG. I relates to an absorbent solution activated with glycine (250 g/l of $K_2O$ and 50 g/l of glycine). Similar diagrams can be achieved easily in view of practical results or suitable calculations for other absorbent solutions, too. It has been found that in the case of a typical regeneration column which operates with countercurrent flow it is necessary to use a quantity of steam (steam for stripping) in a reasonable excess (in practice 2.5 to 3 times) to the quantity corresponding to the "critical" point. The critical point is that point at which the working line of the regenerator is at a minimum distance from the vapor tension line of $CO_2$ (or the other gaseous impurities) at the boiling temperature.

This critical point changes in dependence on the final regeneration degree which is to be achieved. Therefore the quantity of heat which must be added in order to achieve a predetermined regeneration degree changes correspondingly. A diagram can therefore be drawn which corresponds to the diagram of FIG. 1 in which the abscissa shows the carbonation degree to be achieved at the end of the regeneration and the ordinate shows the quantity of heat which corresponds to the stripping steam necessary for the regeneration. When preparing the diagram it is supposed that the spent absorbent solution shows a constant carbonation degree of 75 percent at the beginning of the regeneration and that the loading of the absorbent solution consequently results from the difference between these 75 percent and the various final regeneration degrees shown on the abscissa.

This stripping steam is subdivided into three portions:

A first portion is used for the negative reaction heat (which is 280 kcal/m$^3$ of $CO_2$ in the case of simple or activated alkali carbonate solutions; 930 kcal/m$^3$ of $CO_2$ in the case of monoethanol amine solutions; and 625 kcal/m$^3$ of $CO_2$ in the case of diethanol amine solutions). This first portion is shown by the line M–N in FIG. 1.

The second portion is the steam which accompanies the desorbed $CO_2$ at the outlet at the top of the regenerator.

This steam which in the conventional processes is present in a considerable excess must only be present in quantities which are sufficient to safeguard a reasonable driving force for the desorption of the $CO_2$ and/or $H_2S$. This means that the steam must only be present in such an excess that it is in equilibrium with the carbonation degree of the absorbent solution with which it is contacted. For this purpose the temperature, the point of condensation of the gaseous mixture leaving at the top of the regenerator (i.e. its composition and in particular the concentration of the steam) is only from about 5 to 10°C more than the temperature, i.e. the point of condensation of the gaseous mixture which is in equilibrium with the spent absorbent solution which is fed into the regenerator from the top.

The afore-mentioned statements are exact and suited for being applied since they take into account that the temperature of the absorbent solution is higher than that of the pure solvent due its salt content and that the point of condensation of the gaseous mixture whihc is in equilibrium with the solvent is dependent on the carbonation degree of the solution itself.

In diagram of FIG. 1 in which the spent solution shows a carbonation degree of 75 percent, the heat of the steam which accompanies under the afore-stated conditions the $CO_2$ leaving the regenerator — in addition to the 280 kcal/m$^3$ of the reaction heat — is shown by the line H–I which is practially horizontal.

The third portion of the stripping steam corresponds to the section of the ordinate between the curve H–I and the main curve Z–W of the diagram. In order to provide a favorable heat balance of the purifying cycle, this excess steam is according to the process of the invention used to heat the spent absorbent solution in the upper part of the regenerator. In the conventional processes this utilization of the steam is not achieved at all or only partly since the absorbent solution is fed to the top of the regenerator at very high temperatures, i.e., at temperatures which are very close to those prevailing at the bottom of the regenerator or even above. Due to this heating the excess steam cannot be absorbed.

In FIG. 1 the almost horizontal and dotted curves show which heating degree (compare the temperature statments beside these curves) of the absorbent solution can be achieved by utilizing the excess heat mentioned in dependence on the final regeneration degree.

From the diagram of FIG. 1 it can be seen that in the case of regenerating to a very high final regeneration degree (e.g. 23 percent) the steam obtainable is present in a quantity which is sufficient to heat the solution by about 35°C (point Z) whereas in case of less high regeneration degrees (e.g. 33 percent) the absorbent solution is only heated by about 10°C (point W).

2a. In the process of the invention the complete utilization of the excess steam is also achieved by increasing the operating pressure. By increasing the pressure the boiling temperature of the solution is also increased at the bottom of the regenerator which, when compared to the absorbent solution fed in results in a difference of temperature which is sufficient to cause the absorbent solution to absorb and recover the excess steam leaving the top of the regenerator.

The pressure in the regenerator is thus adjusted such that between the top and the bottom of the column a difference in temperature of from about 10° to 35°C is achieved, depending on the regeneration degree desired.

In this connection, it is important in view of the losses of heat stated under (1) and (2) to point out that the increase in pressure per se is not decisive. In order to avoid the loss of heat during expansion/and to obtain the excess steam at the top of the regenerator, a difference in temperature between the top and the bottom of the column is of fundamental significance. The greater this difference in temperature is, the more thoroughly can these stated heat losses be avoided. An optimum utilization of heat is achieved if the actual temperatures of the absorbent solutions are as near as possible to the boiling temperatures under the conditions of the various zones of the regenerator. Consequently, it has to be pointed out that an increase in pressure in the regenerator does not remove the loss of heat during expansion if the temperature of the entering spent solution is equal to the temperature of the leaving regenerated solution or above.

2b. The above, stated conditions correspond to the best thermal utilization of the heat supplied in the purifying cycle. The process of the invention can, of course, be also carried out under conditions with a lower utilization degree, i.e. with differences in temperature between the top and the bottom of the regenerator which are less than of from about 10° to 35°C, e.g., differences of temperature of from about 5° to 35°C.

3. A further loss of heat during the regeneration with steam is due to the fact that the regenereted solution which leaves the regenerator at the boiling temperature shows a remarkable quantity of heat which in the conventional processes is substantially lost in the coolers and is not utilized. Although attempts have been made to utilize this heat and to return it to the top of the regenerator, only incomplete and unsatisfactory results have been achieved so far, since increasing the temperature of the spent solution leads to the losses of heat stated under (1) and (2).

3a. In the process of the invention, the increase of pressure leads to an increase of the heat content of the regenerated solution which causes an increase of temperature up to the boiling temperature at the most. The heat thus recovered and stored in the regenerated principal fraction can be released and utilized in the secondary regeneration column S for the regeneration of the secondary fraction $s$. For this purpose the secondary absorption column S operates at lower temperatures and pressures than the principal regeneration column P.

This difference in temperature (and pressure) between the two absorption columns is preferably of from at least about 10° to 15°C if the heat is released by thermal transmission and of from at least about 5° to 7°C if the regenerated solution of the principal absorption column P is expanded for producing steam this steam being utilized in the secondary absorption column S. Consequently, the pressure of the principal absorption column P is of from at least about 0.2 to 0.5 atmospheres above the pressure of the secondary regeneration column S.

4. From the afore-mentioned statements it follows that the increase in the operating pressure in the regenerator has an abundant and coordinating effect on the thermal activity of the regeneration. This results from the following example:

A spent potassium carbonate solution activated with glycine (or with $As_2O_3$) has a carbonation degree of about 65 percent and an initial temperature of about 115°C. At atmospheric pressure this temperature is clearly above the boiling point due to which fact the absorbent solution in the regenerator is expanded to atmospheric pressure and cooled down to 95°C (or 94°C), i.e. it is cooled by about 20°C, as follows from tables I and II. The heat supplied by the reboiler gradually increases the temperature by about 13°c, i.e., of from about 95° to 108°C, which corresponds to the boiling temperature at almost atmospheric pressure at the bottom of the regenerator.

According to the process of the invention, the actual temperature of the absorbent solution and the boiling temperature approach each other due to an increase in pressure in the regenerator to about 1.8 atmospheres and the cooling becomes neglegibly little, i.e. practically 0, so that the solution maintains its original temperature of 115°C. The quantity. of heat supplied by the reboiler which as compared to operating at atmospheric pressure is unchanged heats the solution by 13°C as stated, i.e., to 128°C, which corresponds to the new boiling temperature of the regenerated absorbent solution at a pressure of 1.8 atm.

The regenerated absorbent solution is then expanded to atmospheric pressure in an expansion chamber. It is cooled down to 106°C and develops steam (in this example 37.8 kg/m$^3$ of the solution) which as already mentioned is used for the regeneration in the secondary regeneration column.

5. In the following the process of the invention is explained by means of FIG. 2.

Figure 2:
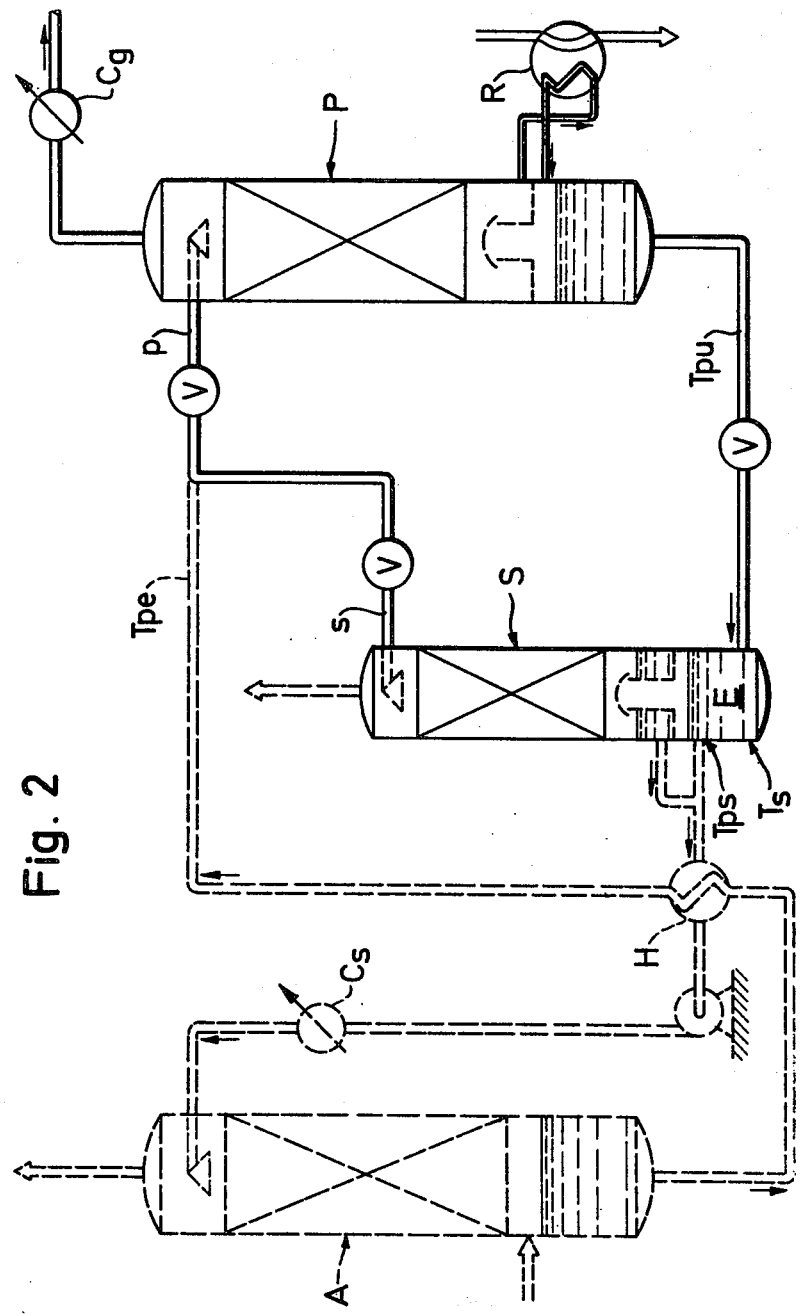
FIG. 2, shows a one-stage absorption plant embodiment of the invention.

FIG. 2 shows a basic and frequently used embodiment of the process of the invention. It consists of a one-stage absorption plant (0.1 percent of $CO_2$). According to the invention two regeneration columns are provided, i.e., the principal regeneration column P and the secondary regeneration column S. The operating pressure in the principal regeneration column P is determined in view of the temperature Tpe of the spent absorbent solution to be regenerated, i.e., it is adjusted such that according to the statements made under (1) and (2) the optimum thermal utilization degree of the cycle is achieved and that by increasing the boiling temperature Tpu of the absorbent solution at the bottom of the regeneration column a favorable difference in temperature is achieved between the tempcatures Tpe and Tpu in the solution at the inlet and at the outlet of this regeneration column. For example, a difference in temperature of 15°C is necessary in order to achieve the optimum result if a solution activated with glycine is regenerated up to a carbonation degree of 30 percent. Greater differences in temperature do not improve the result, whereas smaller differences in temperature reduce the advantages of the process of the invention.

As already mentioned, the best results are obtained at a difference in temperature of from 10° to 35°C. The process of the invention can also be carried out with smaller differences in temperature by achieving a reduced efficiency. The differences in temperature may, for example also range between 5° and 35°C.

As already mentioned, the operating pressure of the principal regeneration column P must also be higher than the pressure of the secondary regeneration column S to enable the heat of the first column to be released to the latter. This can be carried out by heat exchange or according to various other processes. The absorbent solution is preferably fed into the expansion chamber E where it is expanded to the operating pressure of the secondary regeneration column S, i.e., in general to about atmospheric pressure. It is cooled down to about 106°C by developing steam. This steam is led in the secondary regeneration column S in countercurrent with the secondary fraction $s$. The velocity of flow of the steam is adjusted according to conventional aspects such that the quantity of steam is sufficient to achieve a regeneration of the secondary fraction $s$ to the carbonation degree of the principal fraction $p$. Subsequently, the two fractions $p$ and $s$ are combined and fed into the absorption step.

Figure 3:
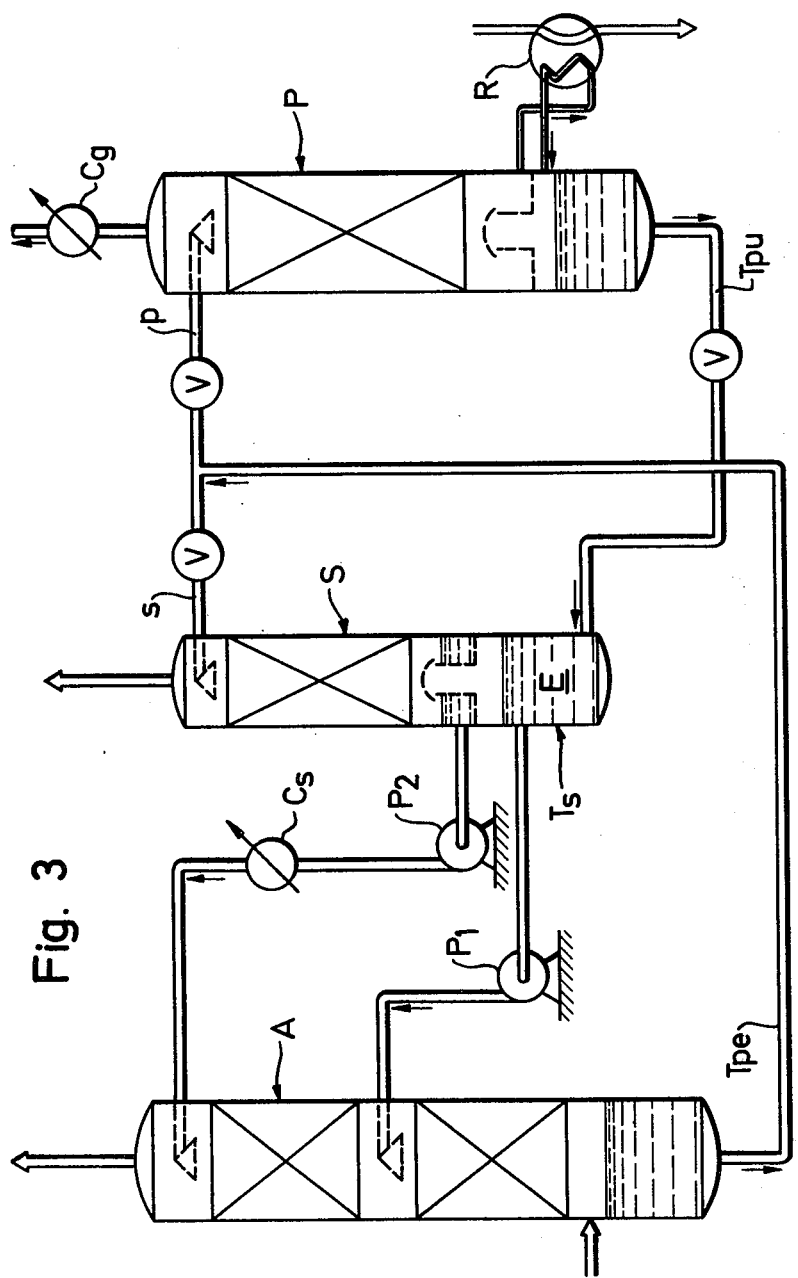
FIG. 3, shows a two-stage cycle embodiment.

FIG. 3 shows a two-stage cycle in which fractions $p$ and $s$ are kept separately and are fed into the absorber at two different points, i.e., at the top and at a point between the top and the bottom.

The division of the absorbent solution into fractions $p$ and $s$ is thus not arbitrary but depends on the fact that the principal fraction $p$ is regenerated with heat supplied from outside, whereas the secondary fraction $s$ is regenerated with the heat released by the principal fraction $p$. As can be seen from the test examples, the quantity of the secondary fraction $s$ is always clearly smaller than that of the principal fraction $p$. FIG. 2 clearly shows that according to the process of the invention the heat which so far has been lost at the top of the regenerator is recovered and used under lower pressure in a secondary regeneration column S for further regeneration purposes. The recovery of heat is achieved by increasing the pressure which results in a reduction of temperature of the spent absorbent solution. FIG. 2 also shows that according to the process of the invention the thermal efficiency is considerably increased by the fact that the heat supplied from outside during the regeneration phase by means of the reboiler R passes two different pressure steps (regeneration column P and regeneration column S) so that the residual heat which is no longer utilizable in the first column is utilized in the second column.

This leads to a better utilization of the heat added in the regeneration step. Consequently the heat consumption according to the process of the invention is reduced by at least one-third to one-half as compared to the heat consumption in conventional processes.

This results in a considerable reduction of the operating costs for the reboiler R. Consequently also the operating costs for the $CO_2$ and/or $H_2S$ coolers at the outlet of columns P and S are reduced. The economizing with regard to the coller of the principal column P is higher which is due to the fact that, according to the process of the invention, exactly that quantity of heat is utilized which according to the conventional processes was released through this cooler. In some cases this cooler is practically not necessary. In most cases it is 5 to 8 times smaller than those used in the conventional processes.

The cooler of the secondary regeneration column S is no longer necessary in many cases and can thus be omitted. In the case of $CO_2$ eliminating plants, the $CO_2$ quantity desorbed in the secondary regeneration column S is only a small portion of the total quantity and can be released together with the steams which leave at the top of the secondary regeneration column S into the atmosphere. Furthermore, a considerable amount of $CO_2$ and/or $H_2S$ and other gaseous impurities are obtained under pressure (i.e. the gases desorbed by the regeneration column P). This constitutes a significant advantage of the process of the invention, e.g., if the $CO_2$ is determined for the production of urea.

As is explained in detail in the following, according to the process of the invention it is possible to renounce a reduction of the heat consumption and to reduce the costs of the plant of the purifying cycle instead.

5a. FIG. 2 shows the absorption step with dotted lines. This is to point out that the regeneration process of the invention can be applied in all conventional purifying processes. The absorption temperatures can be chosen arbitrarily, e.g. between about 40° and 135°C, so that the gaseous mixture to be purified can also have any temperature.

The process of the invention can also be applied for removing any gaseous impurities which can be desorbed from the absorbent solution by stripping with steam. The absorption step may e.g. consist of one single absorber A. In this case an isothermic cycle is involved in which the absorption is performed at high temperatures. The absorption step can also comprise the cooler Cs. In this case the absorption is performed at low temperatures. The absorption step can finally also comprise the heat exchanger H. In this case a conventional cycle is involved in which the absorption is performed at low temperatures, i.e., near ambient temperature, as it is necessary when using ethanol amine solutions. A "spilt-stream" cycle can analogously be employed.

5b. An improved heat utilization of the regenerated solution is achieved by operating the secondary column under reduced pressure, e.g., at 0.7 atm. and at 95°C. In this case a stronger expansion of principal fraction $p$ (to 95°C) and the formation of a larger quantity of steam.

The reduction of pressure can be achieved by a suitable mechanical device. An ejector is preferably used into which the absorbent solution coming from the absorber is fed under pressure see German Unexamined Published Pantent Application DT-OS 19 51 277.

Instead of applying underpressure to the secondary regeneration column S, it is also possible to transmit the heat of the regenerated solution $p$ to the absorbent solution $s$ by means of a stream of gas. Examples of gases are air, nitrogen and residual gas from the production of ammonia. These gases are first contacted with the warm principal fraction $p$ and subsequently with the secondary fraction $s$. This process is preferably applied whenever possible.

The examples illustrate the invention.

Example 1

This example relates to an embodiment in which $CO_2$ and/or $H_2S$ are removed using a potassium carbonate solution activated with glycine. There is used the single-stage absorption apparatus shown in FIG. 2. The heat exchanger H is not provided. The two fractions $p$ and $s$ are regenerated to the same carbonation degree, subsequently combined and then fed together into the absorber A.

This example comprises a series of variations shown in Table IV.

The spent absorbent solution emerging from the absorber A is directly fed to the regeneration step. The temperature of the absorbent solution is indicated in the uppermost horizontal column in Table IV. As is the case with the known processes, the temperature upon entry into the absorber is 10° to 15°C lower, which is due to the reaction heat in the absorber and the heat possibly supplied by the gas to be purified.

Table IV refers to the case in which the secondary regeneration column S is operated at atmospheric pressure so that the temperature of the absorbent solution at the end of the expansion and at the end of the regeneration is 106°C (compare 2nd horizontal column).

The five different sections in Table IV refer to five different amounts of heat supplied to maintain the cycle (100, 80, 63 50 and 40 kg of steam/m³ of solution of principal fraction $p$). In each section the following values are indicated: heat supplied by the reboiler in kcal/m³ of solution of principal fraction $p$, final regeneration degree of the absorbent solution and p.k. (stated in parts by volume of $CO_2$/ 1 part by volume of the entire absorbent solution $p + s$). It is assumed that the spent solution leaves the absorber in all cases with a carbonation degree of about 75 percent.

The horizontal lines of the various sections in the Table indicate the following values: ratio of principal fraction $p$ to secondary fraction $s$ (2/3), temperature and pressure at the bottom of the principal regeneration column P (5/4), heat consumption expressed in kcal/m$^3$ of $CO_2$ (1) and heat removed through the cooler Cg of the principal regeneration column P (6), stated in percent of the heat supplied by the reboiler.

From the data in Table IV, reliable statements as to the application of the inventive process can be quickly gathered.

Table V corresponds to Table IV, except that the secondary regeneration column S operates at reduced pressure, i.e., the pressure and temperature at the end of the expansion and at the end of the regeneration amount to 0.7 atm and 95°C, respectively.

TABLE IV

Absorbent solution: 250 g/l K$_2$O and 50 g/l glycine

| | | | | | | | | | |
|---|---|---|---|---|---|---|---|---|---|
| $T_1$ | 75°C | 80°C | 85°C | 90°C | 95°C | 100°C | 106°C | 116°C | 120°C |
| $T_2$ | 106°C | 106°C | 106°C | 106°C | 106°C | 106°C | 106°C | 106°C | 106°C | heat = 54,000 Kcal/m$^3$ of solution; regeneration degree = 23%
loading = 32.4 vol. of CO$_2$/vol. of absorbent solution

| | | | | | | | | | |
|---|---|---|---|---|---|---|---|---|---|
| 2/3 | 89.3/10.7 | 83.4/16.6 | 78/22 | 72.7/27.3 | 68.7/31.3 | 64.8/35.2 | 60.8/39.2 | 65/45 | 52.8/47.2 |
| 5/4 | 112.5/1.34 | 117.5/1.57 | 122.5/1.86 | 127.5/2.19 | 132.5/2.54 | 137.5/2.95 | 143.5/3.50 | 153.6/4.60 | 157.5/5.10 |
| 1 | 1,482 | 1,390 | 1,295 | 1,210 | 1,145 | 1,078 | 1,010 | 918 | 880 |
| 6 | 18.9 | 18.9 | 18.9 | 18.9 | 18.9 | 18.9 | 18.9 | 18.9 | 18.9 | heat = 43,200 Kcal/m$^3$ of solution; regeneration degree = 25%
loading = 30.9 vol. of CO$_2$/vol. of absorbent solution

| | | | | | | | | | |
|---|---|---|---|---|---|---|---|---|---|
| 2/3 | | 98/2 | 88.5/11.5 | 81.3/18.7 | 75/25 | 70/30 | 63.5/36.5 | 55.8/44.2 | 53.2/46.8 |
| 5/4 | | 106.7/1.09 | 111.7/1.30 | 116.7/1.54 | 121.7/1.81 | 126.7/2.13 | 132.5/2.55 | 142.7/3.41 | 146.7/3.80 |
| 1 | | 1,370 | 1,230 | 1,135 | 1,045 | 980 | 887 | 780 | 742 |
| 6 | | 22.5 | 22.5 | 22.5 | 22.5 | 22.5 | 22.5 | 22.5 | 22.5 | heat = 34,020 Kcal/m$^3$ of solution; regeneration degree = 28%
loading = 28.6 vol. CO$_2$/vol. of absorbent solution

| | | | | | | | | | |
|---|---|---|---|---|---|---|---|---|---|
| 2/3 | | | 94/6 | 83.2/16.8 | 74.8/25.2 | 66.4/33.6 | 56.2/43.3 | 52.8/47.2 | |
| 5/4 | | | 108.4/1.16 | 113.4/1.38 | 118.2/1.63 | 124.4/1.99 | 134.4/2.70 | 138.2/3.05 | |
| 1 | | | 1,120 | 988 | 890 | 790 | 673 | 627 | |
| 6 | | | 26.4 | 26.4 | 26.4 | 26.4 | 26.4 | 26.4 | | heat = 27,000 Kcal/m$^3$ of solution; regeneration degree = 31%
loading = 26.2 vol. CO$_2$/vol. of absorbent solution

| | | | | | | | | | |
|---|---|---|---|---|---|---|---|---|---|
| 2/3 | | | | 96/4 | 82.2/17.8 | 70/30 | 56.5/43.5 | 54.3/47.5 | |
| 5/4 | | | | 107.3/1.11 | 112.3/1.33 | 118.3/1.63 | 128.3/2.24 | 132.3/2.53 | |
| 1 | | | | 990 | 850 | 724 | 583 | 543 | |
| 6 | | | | 30.5 | 30.5 | 30.5 | 30.5 | 30.5 | | heat = 21,600 Kcal/m$^3$ of solution; regeneration degree = 35%
loading = 23.8 vol. CO$_2$/vol. of absorbent solution

| | | | | | | | | | |
|---|---|---|---|---|---|---|---|---|---|
| 2/3 | | | | | 92.3/7.7 | 74.5/25.5 | 56.2/43.8 | 51.3/48.7 | |
| 5/4 | | | | | 108./1.14 | 114/1.41 | 124/1.96 | 128/2.22 | |
| 1 | | | | | 837 | 675 | 510 | 464 | |
| 6 | | | | | 34.6 | 34.6 | 34.6 | 34.6 | |

TABLE V

Absorbent solution: 250 g/l K$_2$O and 50 g/l glycine

| | | | | | | | | | |
|---|---|---|---|---|---|---|---|---|---|
| $T_1$ | 75°C | 80°C | 85°C | 90°C | 95°C | 100°C | 106°C | 116°C | 120°C |
| $T_2$ | 95°C | 95°C | 95°C | 95°C | 95°C | 95°C | 95°C | 95°C | 95°C | heat = 54,000 Kcal/m$^3$ of solution; regeneration degree = 23%
loading = 32.4 vol. of CO$_2$/vol. of absorbent solution

| | | | | | | | | | |
|---|---|---|---|---|---|---|---|---|---|
| 2/3 | 76.8/23.2 | 72/29 | 67.8/27.3 | 64/36 | 61/39 | 57.8/42.2 | 54.4/45.6 | 49.8/50.2 | 48.2/54.8 |
| 5/4 | 112.5/1.34 | 117.5/1.57 | 122.5/1.86 | 127.5/2.19 | 132.5/2.54 | 137.5/2.95 | 143.5/3.50 | 153.5/4.60 | 157.5/5.10 |
| 1 | 1,280 | 1,200 | 1,130 | 1,064 | 1,013 | 963 | 910 | 830 | 803 |
| 6 | 18.6 | 18.6 | 18.6 | 18.6 | 18.6 | 18.6 | 18.6 | 18.6 | 18.6 | heat = 43,200 Kcal/m$^3$ of solution; regeneration degree = 25%
loading = 30.9 vol. of CO$_2$/vol. of absorbent solution

| | | | | | | | | | |
|---|---|---|---|---|---|---|---|---|---|
| 2/3 | | 80/20 | 73.7/26.3 | 68/32 | 63.5/36.5 | 59.5/40.5 | 55/45 | 49.4/50.6 | 47.3/52.7 |
| 5/4 | | 106.7/1.09 | 111.7/1.30 | 116.7/1.54 | 121.7/1.81 | 126.7/2.13 | 132.5/2.55 | 142.7/3.41 | 146.7/3.80 |
| 1 | | 1,115 | 1,025 | 960 | 890 | 832 | 770 | 690 | 662 |
| 6 | | 22.3 | 22.3 | 22.3 | 22.3 | 22.3 | 22.3 | 22.3 | 22.3 | heat = 34,020 Kcal/m$^3$ of solution; regeneration degree = 28%
loading = 28.6 vol. of CO$_2$/vol. of absorbent solution

| | | | | | | | | | |
|---|---|---|---|---|---|---|---|---|---|
| 2/3 | | | 73.3/26.7 | 66.5/33.5 | 60.8/39.2 | 55.5/44.5 | 48/52 | 45.7/54.3 | |
| 5/4 | | | 108.4/1.16 | 113.4/1.38 | 118.2/1.63 | 124.4/1.98 | 134.4/2.70 | 138.4/3.05 | |
| 1 | | | 875 | 792 | 724 | 660 | 572 | 545 | |
| 6 | | | 26.3 | 26.3 | 26.3 | 26.3 | 26.3 | 26.3 | | heat = 27,000 Kcal/m$^3$ of solution, regeneration degree = 31%
loading = 26.2 vol. of CO$_2$/vol. of absorbent solution

| | | | | | | | | | |
|---|---|---|---|---|---|---|---|---|---|
| 2/3 | | | | 70.2/29.8 | 63/37 | 55.5/44.5 | 46.6/53.4 | 43.7/56.3 | |
| 5/4 | | | | 107.3/1.11 | 112.5/1.33 | 118.3/1.63 | 128.3/2.24 | 132.3/2.53 | |
| 1 | | | | 727 | 650 | 575 | 482 | 452 | |
| 6 | | | | 30.5 | 30.5 | 30.5 | 30.5 | 30.5 | | heat = 21,600 Kcal/m$^3$ of solution; regeneration degree = 35%
loading = 23.8 vol. of CO$_2$/vol. of absorbent solution

| | | | | | | | | | |
|---|---|---|---|---|---|---|---|---|---|
| 2/3 | | | | | 64/36 | 55/45 | 44.5/55.5 | 41.4/58.6 | |
| 5/4 | | | | | 108/1.14 | 114/1.41 | 124/1.96 | 128/2.22 | |
| 1 | | | | | 580 | 500 | 404 | 374 | |
| 6 | | | | | 34.7 | 34.7 | 34.7 | 34.7 | |

TABLE V-continued

Absorbent solution: 250 g/l K₂O and 50 g/l glycine

Notes:
$T_1 =$  temperature of the spent absorbent solution fed to the regeneration step
$T_2 =$  temperature of the regenerated absorbent solution
$2/3 =$  % of solution principal fraction/secondary fraction (p/s)
$5/4 =$  temperature (°C)/pressure (atm) of the absorbent solution at the bottom of the principal regeneration column P
$1 =$  heat consumption (Kcal/Nm³ $CO_2$)
$6 =$  heat removed through the cooler Cg (% of the heat supplied by the reboiler)

From Tables IV and V the advantages of the inventive process are apparent. Among others, the following observations can be made:

6a. The last and penultimate sections of Tables IV and V show that when the temperature upon entry into the regenerator is 106°C (compare last but two columns) and the heat supply is 21,600 or 27,000 cal/m³, respectively, of principal fraction p, as is frequently the case in modern processes for eliminating $CO_2$, the heat consumption is only 675 or 575kcal/m³ of $CO_2$, i.e., about half the heat consumption of conventional processes.

It is to be noted that under these heat supply conditions it is necessary to apply a two-stage process (compare examples 2 to 4) for a purification up to, e.g., 0.05 to 0.10 percent of $CO_2$ as is often required.

6b. Frequently, when processes on industrial scale are concerned, larger quantities of heat are available, e.g., 12,000 to 13,000 kcal/m³ of $CO_2$. In that case the inventive process is preferably carried out in accordance with the first two sections in Tables IV and V. Under these conditions one obtains in a single-stage process using a glycine-activated absorbent solution (these are the conditions to which the tables refer) a regeneration degree of 23 percent (first section) and 25 percent (second section). These regeneration degrees are perfectly sufficient to ensure obtaining the purification degrees of 0.05 to 0.1 percent of $CO_2$ required in modern processes. However, the fundamental advantage is involved that the process can be carried out in a single step, thereby considerably reducing plant costs in comparison with the two-stage process.

An additional advantage resides in the fact that the absorption can be carried out at relatively low temperatures (60° to 80°C) without the usual heat exchanger being required which is provided between the spent and the regenerated absorbent solution in the conventional cycle.

6c. Table IV refers to various cases of application in which the spent solution has a temperature of 75° to 120°C at the beginning of the regeneration. It is noted that at temperatures below 106°C the regeneration proceeds only by means of the heat supplied by the reboiler during the regeneration phase. However, this heat can be better utilized, which results in a heat consumption lower than that of conventional processes. If the temperatures are above 106°C, the heat assumed by the cycle during the absorption step is also used for the regeneration (i.e., heat of reaction + amount of heat possibly supplied by the gaseous mixture to be purified − the amount of heat lost in the cooler). At a temperature of 106°C (corresponding to the temperature of the absorbent solution at the end of the expansion and at the end of the regeneration) the absorption step and the regeneration step are thermally independent from each other. According to Table V the temperature at which thermal independence between the two steps is reached is 95°C.

In the following the above comments are illustrated in more detail with a view to FIG. 2:

$Ts \geq Tpe$: The heat utilized in the secondary absorption column S is solely supplied by the reboiler R. Thereby, the heat losses in conventional processes are partially avoided.

$Ts < Tpe$: A part of the heat utilized in the secondary regeneration column S originates from the absorption step (reaction heat + heat supplied by the gaseous mixture to be purified − amount of heat lost on cooling of the absorbent solution).

According to a substantial feature of the inventive process, $Tpu$ is always greater than $Ts$. The difference of $Tpu − Tps$ indicates the amount of heat obtained from the principal fraction p which is employed in the secondary absorption column S.

EXAMPLE 2

This example refers to an embodiment of the inventive process in which $CO_2$ and/or $H_2S$ are eliminated in two steps according to FIG. 3. FIG. 3 differs from FIG. 2 only inasmuch as the feed zones for the fractions of the absorbent solutions s and p after the regeneration are at the top or at a level between the top and the bottom of the absorber A.

The absorbent solution consists of a potassium carbonate solution activated with glycine. The spent solution emerges from the absorber at a temperature of 111°C. The pressure of the principal regeneration column P is adjusted to 1.85 atm (correspondingly the boiling temperature changes by about 18°C; consequently, the absorbent solution having the actual temperature of 111°C and a pressure of 1.85 atm behaves like a solution of 93°C and 1 atm. Accordingly, in view of Table I the loss of heat during the expansion and also the loss caused by the excess steam emerging from the regenerator are practically avoided).

The principal regeneration column P is a conventional packed column and is externally heated by the reboiler R. The necessary amount of heat supplied for the regeneration of the glycine-activated potassium carbonate solutions up to a carbonation degree of 35 percent is 35 to 40 kg steam/m³ of solution. In general, the absorbent solution of gases to be purified having a $CO_2$ content of 18 to 22 percent and a pressure of about 25 atm absorbs up to 23 to 25 parts by volume of $CO_2$/1 part by volume of absorbent solution p.

The temperature at the bottom of the principal regeneration column P is 122°C. This temperature corresponds to the boiling temperature at a pressure of 1.85 atm. Fraction $p$ is subsequently fed to the expansion chamber E, where it expands to atmospheric pressure and develops, while cooled to 108°C, 25.8 kg of steam/m³ of absorbent solution $p$.

In the two-stage process according to FIG. 3, it is usually preferred that the secondary fraction $s$ is more highly regenerated and is therefor fed into the top of the absorber, while the principal fraction $p$ is less highly regenerated and is fed to the absorber at an intermediate level.

For this purpose it is necessary as in the conventional processes to feed about 110 kg of steam/m³ of secondary fraction $s$. This secondary fraction $s$ is then regenerated in this manner to a carbonation degree of 25 percent (this applies to potassium carbonate solutions activated with glycine). Thus, an average absorption of about 27 to 30 parts by volume of $CO_2$/1 part by volume of solution $s$ is obtained.

The separation of the absorbent solution into principal fraction $p$ (supplying 25.8 kg of steam/m³ of absorbent solution upon expansion) and secondary fraction $s$ (requiring 110 kg/m³ of steam for its regeneration) consequently amounts to 81 percent of principal fraction and 19 percent of secondary fraction.

Finally, the principal fraction $p$ having a temperature of 108°C is removed from the expansion chamber E and is directly fed to the absorption column A at an intermediate level by means of the pump $P_1$. The more highly regenerated fraction $s$ is likewise removed from the bottom of the column S at a temperature of 108°C and is fed to the top of the absorption column by means of the pump $P_2$. Since according to this example a high purification of the gaseous mixture is desired (i.e. 0.05 to 0.1 percent of $CO_2$ in the washed gas), it is advantageous to cool the solution in the cooler Cs to e.g., 50° to 70°C. In this case the weight average temperature of the two fractions is about 98°C.

The absorber A is an ordinary absorption column consisting, as is apparent from FIG. 3, of a single two-stage absorption zone. In this column the absorbent solution is heated as usual by the heat of reaction and the heat contained in the gaseous mixture to be purified by about 13°C., i.e., from 98° to 111°C, and emerges at this temperature from the bottom of the absorber. The absorbent solution contains the $CO_2$ and/or $H_2S$ absorbed from the gaseous mixture.

The heat consumption in this example results from the amount of heat supplied by the reboiler to the principal fraction $p$, i.e., (35 and 40, respectively) × 0.81 = 28.4 and 32.4 kg, respectively, of steam/m³ of combined absorbent solution.

24 parts by volume of $CO_2$ and 33 parts by volume of $CO_2$, respectively, per 1 part by volume of absorbent solution are absorbed, with a weight average of 25.6 parts by volume of $CO_2$/1 part by volume of combined absorbent solution being obtained. The heat consumption is 1.11 and 1.26 kg, respectively, of steam/m³ of $CO_2$ = 600 and 680 kcal/m³, respectively, of $CO_2$.

This is a remarkable saving as compared to the isothermic cycle equally proceeding in two stages, in which the heat consumption is 1100 and 1300 cal/m³, respectively, of $CO_2$. The rating and dimensions of the reboiler are proportional to the heat consumption of 600 and 680 kcal/m³, respectively, of $CO_2$. The rating and dimensions for the $CO_2$-cooler of the principal regeneration column P amount to only 20 percent of the heat supplied by the reboiler, while the residual heat supplied by the cycle is discharged to the exterior at the top of the secondary column S. This residual heat can be directly discharged to the exterior, thus avoiding the necessity of a cooler. In the majority of cases the $CO_2$ loss is tolerable, which amounts in this example to 24 percent of the total. Finally, the greater part of the $CO_2$ (76 percent) is recovered in the compressed state, i.e., at 1.85 atm.

EXAMPLE 3

The arrangement in FIG. 3 is analogously used in this example, with the more highly regenerated secondary fraction $s$ being fed to the top of the two-stage absorber at a temperature of 108°C, i.e., without cooling.

The calculations according to Example 2 lead to a distribution of the absorbent solution into 72.4 percent of principal fraction $p$ and 27.6 percent of secondary fraction $s$, a pressure of 2.45 atm at the bottom of the principal column P, and a heat consumption of 520 and 590 cal/m³, respectively, of $CO_2$.

EXAMPLE 4

Other than in Example 2 the principal column P is operated at atmospheric pressure and the secondary column S at reduced pressure, i.e., at 0.57 atm, and at a temperature of 90°C. The absorbent solution emerging from the bottom of absorber A at a temperature of 98°C is divided as follows: 77 percent of principal fraction $p$, which is regenerated in P at atmospheric pressure and at a final temperature of 108°C, and 23 percent of secondary fraction $s$, which is regenerated in the secondary column S at 0.57 atm. and at a temperature of 90°C corresponding to the boiling temperature of the absorbent solution.

The secondary fraction $s$ is further cooled to 70°C in the cooler Cs and fed to the top of the absorber A. The principal fraction $p$ is fed directly to an intermediate level in the absorber A at a temperature of 90°C. The heat consumption is 550 to 630 kcal/m³ of $CO_2$.

As was already explained in section (3a) the reduced pressure in the secondary column S is preferably produced by an ejector, simultaneously utilizing the energy of the spent pressurized absorbent solution. Alternatively, the heat of the regenerated absorbent solution $p$ may be transferred to the absorbent solution $s$ by means of a stream of gas, e.g., air, nitrogen or residual gas from the ammonia synthesis, with the principal fraction $p$ and subsequently the secondary fraction $s$ being brought into contact with the stream of gas.

EXAMPLE 5

In this example the inventive process is applied to an already available purification plant with the aim of reducing the heat supply or avoiding the necessity of the usual heat exchanger. In this case the separation of $H_2S$ which is accompanied by $CO_2$ is referred to by means of the conventional cycle.

The plant operates with a potassium carbonate solution activated with glycine, diethanol amine or similar compounds. Concurrently, a usual monoethanol amine solution is used. The values for the monoethanol amine solution are indicated in parentheses.

The plant operates according to the process described in the following under (a). This process is modified inasmuch as the inventive secondary regeneration column S is added, whereby the heat consumption is reduced. Item (b) sets forth that the saving is either with respect to the heat consumption or the necessary equipment.

Finally, the plant is also modified in that the heat supply is reduced to the amount stated under (a) and the heat exchanger is removed from between the regenerated and the spent absorbent solution. Item (c) sets forth the conditions allowing for the omission of the heat exchanger.

a. The plant operating according to usual processes comprises an absorption column from which the spent solution emerges at a temperature of 65°C. The solution is then preheated by the heat exchanger to about 98°C and fed at this temperature to the regeneration column. The regeneration column is a conventional packed column to which an amount of heat of about 100 kg of steam/m$^3$ of absorbent solution (120 kg steam/m$^3$ of absorbent solution) is supplied through the reboiler.

The absorbent solution leaves the regenerator at a temperature of about 108°C, passes the heat exchanger and then a cooler cooling it to 60.6°C (50.5°C), and is then fed to the absorption column. In the absorber the solution absorbs about 15 parts by volume of $H_2S$ + $CO_2$ and is heated by about 4.5°C (14.5°C).

Under the above-mentioned conditions, the heat balance of the regenerator shows that the amount of heat removed at the top of the column is about 40,500 (41,500) kcal/m$^3$ of absorbent solution and 2,700 (2,770) kcal/m$^3$, respectively, of $CO_2$ + $H_2S$. The amount of heat is discharged to the exterior via the cooler.

b. The plant is modified by adding the secondary column S, while the already available regeneration column assumes the function of the principal column P. The principal column P is operated at a pressure of 3.78 atm., whereby the loss of heat at the top of the column is reduced to 4,860 kcal/m$^3$ of absorbent solution, i.e., to 324 cal/m$^3$ of $CO_2$. Due to this pressure the temperature of 98°C at the top of the column has the same effect as a temperature of 56°C at atmospheric pressure.

At the bottom of the principal regeneration column P the solution assumes a temperature of 146°C. This rise in temperature is caused by the heat whose loss is prevented at the top of the column. The supply of heat through the reboiler remains constant.

Subsequently, the absorbent solution is expanded to atmospheric pressure, thereby cooling it to about 106°C and producing 68.7 (70.5) kg of steam/m$^3$ of absorbent solution p. This steam is passed to the secondary regeneration column S.

The distribution of the absorbent solution to the principal regeneration column P and the secondary regeneration column S is 59 (63) percent of principal fraction p and 41 (37) percent of secondary fraction s, with 100 (120) kg of steam/m$^3$ of solution having to be supplied to the secondary column S.

The heat consumption is remarkably reduced, i.e., the heat supply is lowered to 59 (75.5) kg of steam/m$^3$ of combined absorbent solution p + s. This heat consumption amounts to only 59 (63) percent of the predescribed process.

c. The plant is modified by omitting the heat exchanger. The entire equipment mentioned under (b) remains unchanged. The amount of heat supplied from the exterior is 100 (120) kg of steam/m$^3$ of absorbent solution as in (a).

Under these conditions the increased heat supply of 41 (44.5) kg of steam/m$^3$ of absorbent solution allows the absorbent solution to be fed into the regeneration step at a temperature of 74.2°C (73°C) instead of 98°C mentioned before. Simultaneously, there is a considerable increase in stripping steam at the bottom of the column, thereby substantially improving the regeneration degree.

In the following further embodiments of the inventive process are described.

Figure 4:
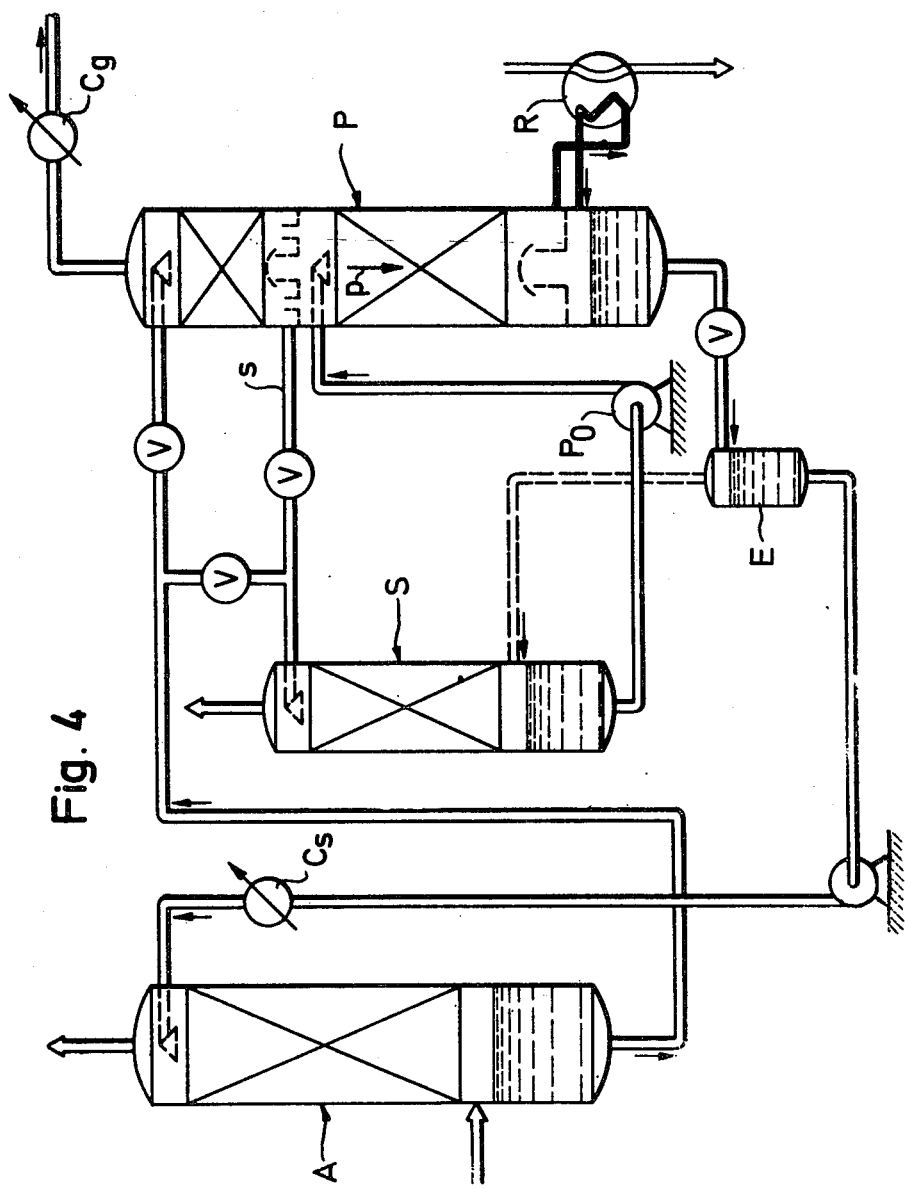
FIG. 4, shows an alternate embodiment in which the secondary s fraction is fed into the principal regeneration column p at an intermediate level.

7. FIG. 4 shows a variant according to which the secondary fraction s is fed into the principal regeneration column P at intermediate level by means of a pump. This embodiment makes possible the removal of the heat exchanger between the spent and the regenerated absorbent solution in a facilitated manner. This heat exchanger has the function of returning the heat of the regenerated solution to the top of the regenerator. The same purpose is achieved by means of the arrangement shown in FIG. 4.

The absorbent solution coming from the absorber with low temperature (e.g., 50° to 70°C) is directly fed into the principal regeneration column P. According to the process of the invention, the principal regeneration column P is operated at an elevated pressure in order to avoid the loss of heat during expansion and to absorb the excess steam which accompanies the desorbed gaseous impurities, by heating the absorbent solution. After having passed the upper part of the principal regeneration column P, the absorbent solution is subdivided into two fractions. The principal fraction p passes down in the principal regeneration column P, whereas the secondary fraction s is isolated and fed to the top of the secondary regeneration column S. In this secondary regeneration column the absorbent solution is treated with the steam coming from the expansion chamber E. At this point the secondary fraction s is returned to a suitable level of the principal regeneration column P by means of a pump P$_0$ which means a difference to FIG. 2. The point of inlet is chosen such that the absorbent solution p streaming downwards and the absorbent solution s added show such temperatures and regeneration degrees that they need the same amount of heat from the reboiler before they reach the bottom of the column itself.

The division of the spent solution into the fractions p and s can also be carried out at the beginning of the regeneration and not only at intermediate level of the principal regeneration column P.

In both cases the heat contained in the regenerated absorbent solution p + s is led to the top of the regenerator, which in the conventional processes was the task of the conventional heat exchanger which in the present process is deleted. The present process has the further advantage that the loss of heat at the top of the regenerator and the duty of the cooler for the desorbed gaseous impurities is substantially reduced.

Figure 5:
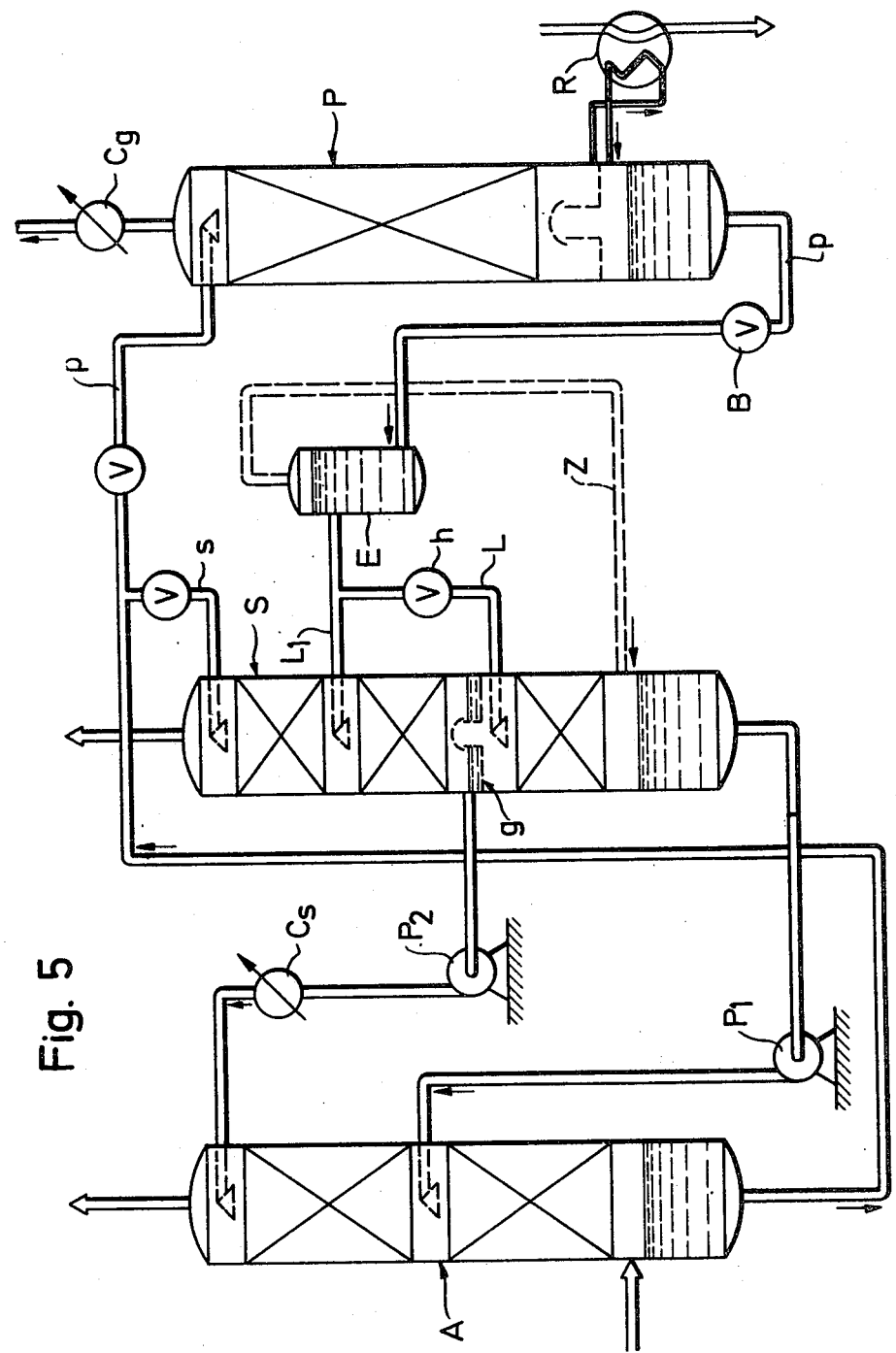
FIG. 5, shows an embodiment in which steam obtained by the expansion of the principal fraction p is also used for improving the regeneration of the principal p fraction.

8. FIG. 5 shows an arrangement in which the steam obtained by the expansion of the principal fraction p is used not only for the regeneration of the secondary fraction s but also for improving the regeneration of the principal fraction p. The principal fraction p is removed at the bottom of the principal regeneration column P and fed into the expansion chamber E through the valve B, where it is expanded to the pressure of the secondary regeneration column S. Steam is developed which is fed through pipe z to the bottom of column S from where it streams upwards and regenerates the countercurrent absorbent solution.

The absorbent solution expanded in E is fed through pipe L by being regulated by valve h into the secondary regeneration column S at intermediate level where the regeneration is completed by means of the previously developed steam. Subsequently the absorbent solution is gathered at the bottom of the column, isolated by means of pump $P_1$ and fed into the absorber. The secondary fraction $s$ is regenerated in the upper zone of the secondary regeneration column S and gathered at the separating plate $g$ from where it is fed into the absorber by means of pump $P_2$.

By regulating valve $h$ it is possible to fed a part of the principal fraction $p$ through pipe $L_1$ into the upper half of the secondary regeneration column S and to simultaneously reduce the portion of the absorbent solution fed into the lower zone, which results in a higher regeneration.

Figure 6:
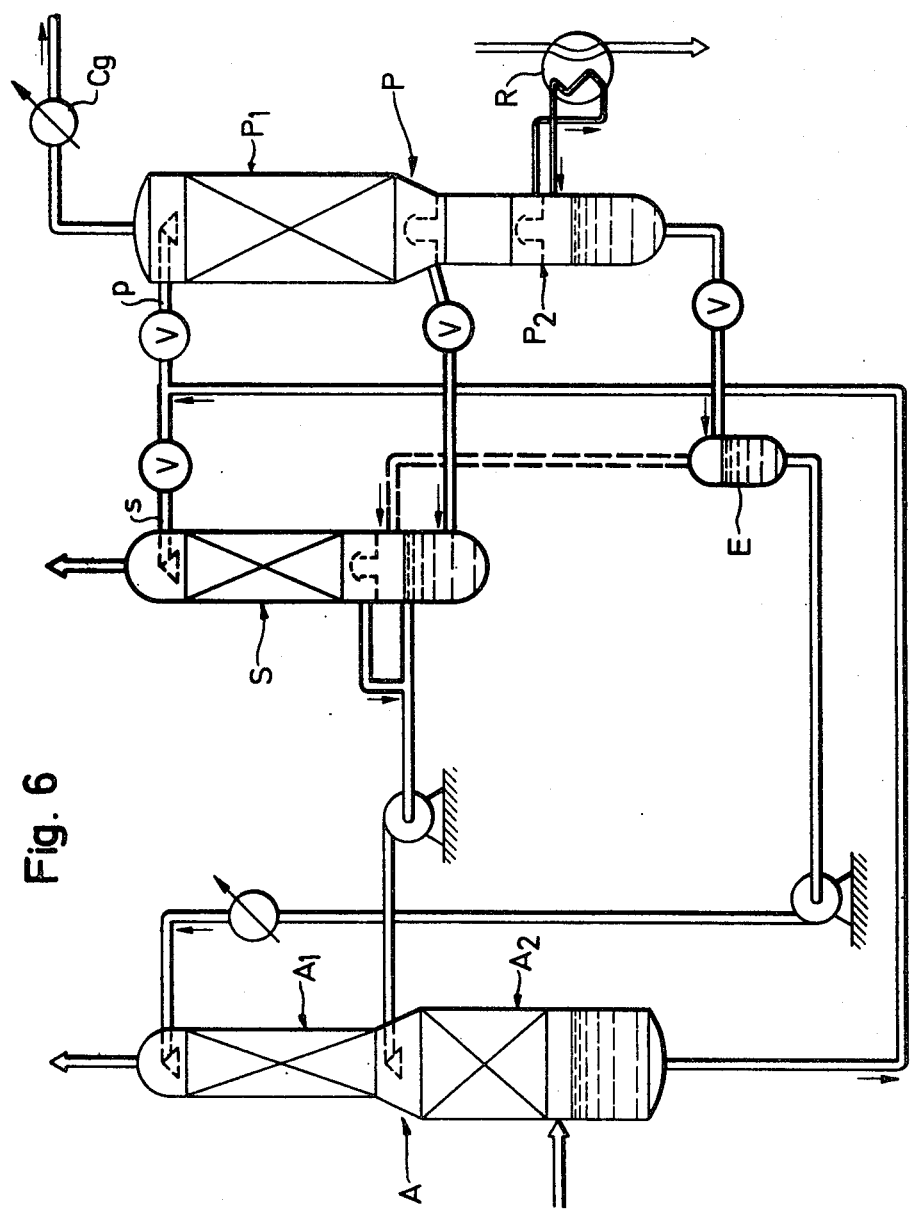
FIG. 6, shows a two-stage plant embodiment.

9. FIG. 6 shows how the process of the invention can be applied in a two-stage plant. This embodiment of the process of the invention is particularly suitable if an already available two-stage plant shall be improved.

The conventional plant is shown in FIG. 6 with thin lines. In order to apply the process of the invention, it is sufficient to add the secondary regeneration column S drawn with thicker lines whereas the regeneration column already present is operated as principal regeneration column P.

The spent solution is divided as follows:

The secondary fraction $s$ is fed into the secondary regeneration column S and the principal fraction $p$ into the principal regeneration column P. The principal fraction $p$ itself is subdivided at the outlet of the first column step as follows: one portion is fed downwards into the second step $P_2$ and is fed into the second step of the absorption column $A_2$ at the outlet of this step, whereas the other portion of the principal fraction $p$ is combined with the secondary fraction $s$ and is fed together with said secondary fraction $s$ into the first step of the absorption column $A_1$.

10. Finally, it is possible to apply the process of the invention also in combination with the arrangement as known from German Unexamined Published Patent Application DT-OS 19 35 712 (in particular FIG. 2). According to this process, the absorption column is subdivided into two zones, the upper zone being determined for the chemical absorption of $CO_2$, $H_2S$ and/or other similar gaseous impurities and the lower zone being determined for the physical absorption of the heat contained in the gaseous mixture to be purified, which for this purpose can exhibit a very high temperature.

The combination of the process of the invention and the aforementioned arrangement is preferably carried out as follows:

The combined absorption solution $p + s$ is fed to the top of the absorption column and causes the chemical absorption of $CO_2$ and/or $H_2S$ and/or other gaseous impurities in the upper zone. At the end of the upper zone the absorbent solution is divided into two fractions. The first fraction is removed from the absorption column and fed into the secondary regeneration column S and adopts thus the function of the secondary fraction $s$. The secondary fraction $p$ passes further downwards into the lower zone of the absorption column where it absorbs the heat contained in the gaseous mixture to be purified. Subsequently, the fraction thus heated in fed into the principal regeneration column P. Fractions $p$ and $s$ thus regenerated in the regeneration columns P and S are fed into the afore-mentioned absorption step.

This embodiment has the advantage that the heat contained in the gaseous mixture to be purified is gathered only the principal fraction $p$ under conditions favorable for the re-utilization in the cycle. The temperature of the gaseous mixture to be purified can also correspond to the temperature with which it leaves the reboiler of the principal regeneration column P (e.g., 120° to 125°C). This temperature can, however, also be considerably higher.

11. It is finally possible according to a further embodiment of the process of the invention to divide the solution into the principal and secondary fraction in the absorption phase, similar as in (10). For this purpose one fraction of the absorbent solution is removed from the bottom of the absorber and the other fraction at intermediate level of the absorber.

Both fractions are then regenerated in the principal regeneration column P and in the secondary regeneration column S as is described before. The fraction removed at intermediate level of the absorber is preferably regenerated more highly in the column S and returned into the top of the absorber after corresponding cooling. The fraction removed from the bottom of the absorber is preferably regenerated in column P to a small extent and then returned into the absorber at intermediate level.

We claim:

1. In a process for removing gaseous impurities selected from the group consisting of $CO_2$, $H_2S$, HCN and $SO_2$ from a mixture of gases by an absorption technique wherein an aqueous alkaline scrubbing solution selected from the group consisting of an alkali metal carbonate solution, an alkali metal carbonate solution activated by $As_2O_3$, an alkali metal carbonate solution activated by glycine, an alkali metal carbonate solution activated by an aminoacid, an alkali metal carbonate solution activated by ethanolamine, an alkali metal carbonate solution activated by a salt of boric acid, a solution of an alkali metal salt of an amino acid, an ethanol amine solution, an alkali phosphate solution, an alkali phenate solution, an alkali borate solution, and an alkali sulfite/alkali bisulfite solution is used to absorb said gaseous impurities from said mixture of gases in an absorption stage, and wherein said scrubbing solution is regenerated by being circulated to a regeneration stage wherein said gaseous impurities are desorbed from said scrubbing solution by contact with steam under reduced pressure, said regeneration stage actually consisting of two regeneration stages, respectively principal and secondary, the principal stage operating at a temperature and pressure higher than the secondary stage, and wherein said scrubbing solution is then recycled to said absorption stage, the improvement which comprises:

a. withdrawing said scrubbing solution containing said absorbed gaseous impurities from said absorption stage at a temperature of between about 40° and about 135°C;

b. circulating said scrubbing solution of (a) as an input to said principal regeneration stage wherein steam is contacted with said scrubbing solution to desorb said gaseous impurities;

c. regulating the amount of heat supplied to said principal regeneration stage and regulating the pressure to create a temperature difference between the temperature of said input scrubbing solution of (b) and the desorbed scrubbing solution exited from said principal regeneration stage of from 10° to 35°C and thereby obtain a temperature differential of from 5° to 10°C between the dew point of the gaseous mixture consisting of said steam and desorbed gaseous impurities removed from said principal regeneration stage and the dew point of the gaseous mixture in equilibrium with said input scrubbing solution of (b);
d. withdrawing from said principal regeneration stage the regenerated scrubbing solution, and lowering the pressure of said regenerated scrubbing solution to thereby flash off steam;
e. feeding said flashed off steam of (d) to said secondary regeneration stage as stripping steam, said secondary regeneration stage being operated at a temperature and pressure lower than that in said principal regeneration stage; and
f. recycling said regenerated scrubbing solution from the principal regeneration stage as well as regenerated scrubbing solution from the secondary regeneration stage to said absorption stage.

2. In a process for removing gaseous impurities selected from the group consisting of $CO_2$, $H_2S$, HCN and $SO_2$ from a mixture of gases by an absorption technique where in a aqueous alkaline scrubbing solution selected from the group consisting of an alkali metal carbonate solution, an alkali metal carbonate solution activated by $As_2O_3$, an alkali metal carbonate solution activated by glycine, an alkali metal carbonate solution activated by an aminoacid, an alkali metal carbonate solution activated by ethanolamine, an alkali metal carbonate solution activated by a salt of boric acid, a solution of an alkali metal salt an ethanol amine solution, an alkali phenate solution, an alkali borate solution, and an alkali sulfite/alkali bisulfite solution is used to absorb said gaseous impurities from said mixture of gases in an absorption stage, and wherein said scrubbing solution is regenerated by being circulated to a regeneration stage wherein said gaseous impurities are desorbed from said scrubbing solution by contact with steam under reduced pressure, said regeneration stage actually consisting of two regeneration stages, respectively principal and secondary, the principal stage operating at a temperature and pressure higher than the secondary stage, and wherein said scrubbing solution is then recycled to said absorption stage, the improvement which comprises:
  a. withdrawing said scrubbing solution containing said absorbed gaseous impurities from said absorption stage at a temperature of between about 40° and 135°C;
  b. dividing said scrubbing solution of (a) into two separate fractions, and circulating a principal fraction to said principal regeneration stage and a secondary fraction to said secondary regeneration stage;
  c. regulating the amount of heat supplied to said principal regeneration stage and regulating the pressure thereof to create a temperature difference between the temperature of said principal scrubbing solution of (b) and the desorbed scrubbing solution exited from said principal regeneration stage of from 10° to 35°C and thereby obtain a temperature differential of from 5° to 10°C between the dew point of the gaseous mixture consisting of said steam and desorbed gaseous impurities removed from said principal regeneration stage and the dew ppint of the gaseous mixture in equilibrium with said principal scrubbing solution of (b);
  d. withdrawing from said principal regeneration stage the regeneration scrubbing solution, and lowering the pressure of said regenerated scrubbing solution to thereby flash off steam;
  e. feeding said flashed off steam of (d) to said secondary regeneration stage as stripping steam, said secondary regeneration stage being operated at a temperature and pressure lower than that in said principal regeneration stage; and
  f. withdrawing regenerated secondary scrubbing solution from said secondary regeneration stage, combining said regenerated secondary scrubbing solution with said regenerated principal scrubbing solution of (d), and recycling said combined solution to said absorption stage.

3. The process of claim 2, wherein said combined solutions in (f) are cooled prior to recycling to said absorption stage.

4. The process of claim 2, wherein said absorption stage is in the form of an absorption column having a top and a bottom, and wherein said combined solutions in (f) are recycled to the top of said column.

5. The process of claim 2, wherein said absorption stage is in the form of an absorption column having a top and a bottom, and wherein instead of combining said regenerated principal and secondary scrubbing solutions in (f), said principal regenerated scrubbing solution from (e) is cooled and recycled to the top of said absorption column, and said secondary scrubbing solution withdrawn from said secondary regeneration stage is recycled to said absorption column intermediate the top and bottom thereof.

6. In a process for removing gaseous impurities selected from the group consisting of $CO_2$, $H_2S$, HCN and $SO_2$ from a mixture of gases by an absorption technique wherein an aqueous alkaline scrubbing solution selected from the group consisting of an alkali metal carbonate solution, an alkali metal carbonate solution activated by $As_2O_3$, an alkali metal carbonate solution activated by glycine, an alkali metal carbonate solution activated by an aminoacid, an alkali metal carbonate solution activated by ethanolamine, an alkali metal carbonate solution activated by a salt of boric acid, a solution of an alkali metal salt of an amino acid, an ethanol amine solution, an alkali phosphate solution, an alkali phenate solution, an alkali borate solution, and an alkali sulfite/alkali bisulfite solution is used to absorb said gaseous impurities from said mixture of gases in an absorption stage, and wherein said scrubbing solution is regenerated by being circulated to a regeneration stage wherein said gaseous impurities are desorbed from said scrubbing solution by contact with steam under reduced pressure, said regeneration stage actually consisting of two regeneration stages, respectively principal and secondary, the principal stage operating at a temperature and pressure higher than the secondary stage, and wherein said scrubbing solution is then recycled to said absorption stage, the improvement which comprises:
  a. withdrawing said scrubbing solution containing said absorbed gaseous impurities from said absorption stage at a temperature of between about 40° and about 135°C;
  b. dividing said scrubbing solution of (a) into two separate fractions, and circulating a principal fraction to said principal regeneration stage and a secondary fraction to said secondary regeneration stage;

c. regulating the amount of heat supplied to said principal regeneration stage and regulating the pressure thereof to create a temperature difference between the temperatures of said principal scrubbing solution of (b) and the desorbed scrubbing solution exited from said principal regeneration stage of from 10° to 35°C and the reby obtain a temperature differential of from 5° to 10°C between the dew point of the gaseous mixture consisting of said steam and desorbed gaseous impurities removed from said principal regeneration stage and the dew point of the gaseous mixture in equilibrium with said principal scrubbing solution of (b);

d. withdrawing from said principal regeneration stage the regenerated principal scrubbing solution and lowering the pressure thereof to a value below the value in said principal regeneration stage, treating said scrubbing solution with a stream of inert gases to obtain a mixutre stream of inert gases and steam;

e. delivering said mixture steam of inert gases and steam to said second regeneration stage as a stripping mixture;

f. recycling said regenerated principal scrubbing solution and said regenerated secondary scrubbing solution to said absorption stage.

7. In a process for removing gaseous impurities selected from the group consisting of $CO_2$, $H_2S$, HCN and $SO_2$ from a mixture of gases by an absorption technique wherein an aqueous alkaline scrubbing solution selected from the group consisting of an alkali metal carbonate solution, an alkali metal carbonate solution activated by $As_2O_3$, an alkali metal carbonate solution activated by glycine, an alkali metal carbonate solution activated by an aminoacid, an alkali metal carbonate solution activated by ethanolamine, an alkali metal carbonate solution activated by a salt of boric acid, a solution of an alkali metal salt of an amino acid, an ethanol amine solution, an alkali phosphate solution, an alkali phenate solution, an alkali borate solution, and an alkali sulfite/alkali bisulfite solution is used to absorb said gaseous impurities from said mixture of gases in an absorption stage, and wherein said scrubbing solution is regenerated by being circulated to a regeneration stage wherein said gaseous impurities are desorbed from said scrubbing solution by contact with steam under reduced pressure, said regeneration stage actually consisting of two regeneration stages, respectively principal and secondary, the principal stage operating at a temperature and pressure higher than the secondary stage, and wherein said scrubbing solution is then recycled to said absorption stage, the improvement which comprises:

a. withdrawing said scrubbing solution containing said absorbed gaseous impurities from said absorption stage at a temperature of between about 40°C. and 135°C;

b. delivering all of said scrubbing solution of (a) to said principal regeneration stage having an upper portion and a lower portion, said scrubbing solution being passed to said upper portion, and subdividing said scrubbing solution into a principal fraction and a secondary fraction at the bottom of said upper portion;

c. withdrawing said secondary fraction at the bottom of said upper portion from said principal regeneration stage and delivering it to said second regeneration stage;

d. passing said principal fraction through the lower portion of said principal regeneration stage;

e. withdrawing said principal fraction of regenerated solution from said lower portion of said principal regeneration stage, lowering the pressure of said principal fraction of regenerated solution down to the pressure of said secondary regeneration stage, thereby to flash off steam;

f. feeding said flashed steam into said secondary regeneration stage as stripping steam; and g. withdrawing the secondary fraction of the solution from the secondary regeneration stage, combining said secondary fraction with said principal fraction of regenerated solution, and delivering said combined solutions to said absorption stage.

8. In a process for removing gaseous impurities selected from the group consisting of $CO_2$, $H_2S$, HCN and $SO_2$ from a mixture of gases by an absorption technique wherein an aqueous alkaline scrubbing solution selected from the group consisting of an alkali metal carbonate solution, an alkali metal carbonate solution activated by $As_2O_3$, an alkali metal carbonate solution activated by glycine, an alkali metal carbonate solution activated by an aminoacid, an alkali metal carbonate solution activated by ethanolamine, an alkali metal carbonate solution activated by a salt of boric acid, a solution of alkali metal of an amino acid, an ethanol amine solution, an alkali phosphate solution, an alkali phenate solution, an alkali borate solution, and an alkali sulfite/alkali bisulfite solution is used to absorb said gaseous impurities from said mixture of gases in an absorption stage, and wherein said scrubbing solution is regenerated by being circulated to a regeneration stage wherein said gaseous impurities are desorbed from said scrubbing solution by contact with steam under reduced pressure, said regeneration stage actually consisting of two regeneration stages, respectively principal and secondary, the principal stage operating at a temperature and pressure higher than the secondary stage, and wherein said scrubbing solution is then recycled to said absorption stage, the improvement which comprises:

a. dividing said scrubbing solution from said absorption stage into two fractions, respectively principal and secondary, and delivering said principal fraction to said principal regeneration stage and said secondary fraction to said secondary regeneration stage;

b. regulating the pressure in said principal regeneration stage in order to establish a difference in temperature between the inlet scrubbing solution and the outlet scrubbing solution of from 10° to 35°C as a function of the amount of heat furnished from outside to said principal stage to thereby obtain a difference in temperature of from 5° to 10°C between the dew point of the gaseous mixture consisting of steam and desorbed gaseous impurities issuing from said principal stage, and the dew point of the gaseous mixture in equilibrium with said scrubbing solution entering said principal regeneration stage;

c. removing said secondary fraction of the solution from said secondary regeneration stage and delivering it to an intermediate height of said principal regeneration stage, combining it with said principal fraction and continuing the regeneration of the combined fractions in the lower portion of said principal regeneration stage;

d. removing from said principal stage the combined principal and secondary fractions;

e. lowering the pressure of said combined fractions down to the pressure of said secondary regeneration stage, thereby flashing off steam;

f. feeding said flashed steam into said secondary regeneration stage as stripping steam; and g. returning said combined principal and secondary fractions to said absorption stage.

9. The process of claim 8, wherein said scrubbing solution removed from said absorption stage is delivered entirely to said principal regeneration stage, passed through an upper portion of said principal stage, and subdivided into a secondary fraction which is removed and delivered to the secondary regeneration stage, and a principal fraction which goes on with its regeneration in said principal regeneration stage.

10. The process of claim 8, wherein said combined principal and secondary fractions removed from said principal regeneration stage are cooled and delivered to said absorption stage.

11. The process of claim 8, wherein said combined principal and secondary fractions removed from said principal regeneration stage are brought to the pressure of said secondary regeneration stage and treated with a stream of inert gases to thus obtain a mixture of inert gases and steam, and the resulting mixture of inert gases and steam is delivered to said secondary regeneration stage.

12. The process of claim 8, wherein said secondary fraction of said scrubbing solution is extracted from said absorption stage after passage in a upper zone used for the chemical absorption of said gaseous impurities and wherein the principal fraction of said scrubbing solution is extracted after passage in a lower zone of said absorption stage used for the physical absorption of the heat of the gaseous mixture entering said lower zone of said absorption stage.

13. In a process for removing gaseous impurities selected from the group consisting of $CO_2$, $H_2S$, HCN and $SO_2$ from a gas mixture in an absorption stage by an aqueous alkaline scrubbing solution selected from the group consisting of an alkali metal carbonate solution, an alkali metal carbonate solution activated by $As_2O_3$, an alkali metal carbonate solution activated by glycine, an alkali metal carbonate solution activated by an aminoacid, an alkali metal carbonate solution activated by ethanolamine, an alkali metal carbonate solution activated by a salt of boric acid, a solution of an alkali metal salt of an amino acid, an ethanol amine solution, an alkali phosphate solution, an alkali phenate solution, an alkali borate sulution, and an alkali sulfite/alkali bisulfite solution which is circulated between said absorption stage wherein said gas mixture is scrubbed with said solution and a regeneration stage wherein said scrubbing solution is regenerated with steam at substantially reduced pressure to desorb gaseous impurities therefrom, said regeneration stage actually consisting of two regeneration stages, respectively principal and secondary, the principal stage operating at a temperature and pressure higher than the secondary stage, and wherein said scrubbing solution is then recycled to said absorption stage, the improvement which comprises:

a. dividing said principal stage into two regeneration zones and operating said principal regeneration stage at a pressure and temperature higher than in said secondary regeneration stage by means of an external supply of heat;

b. dividing said scrubbing solution from said absorption stage into two fractions, respectively principal and secondary, and delivering said principal fraction to said principal regeneration stage and said secondary fraction to said secondary regeneration stage;

c. regulating the pressure in said principal regeneration stage in order to establish a difference in temperature between the inlet scrubbing solution and the outlet scrubbing solution of from 10° to 35°C as a function of the amount of heat furnished from outside to said principal stage to thereby obtain a difference in temperature of from 5° to 10°C between the dew point of the gaseous mixture in equilibrium with the scrubbing solution entering said principal regeneration stage;

d. dividing the principal fraction at the bottom of said first zone into two portions, removing said first portion from said principal stage at said bottom of said first zone, delivering said first portion to the bottom of said secondary regeneration stage, and combining said first portion with the secondary fraction removed from said secondary stage and delivering the combined first portion and secondary fractions to an intermediate height of said absorption stage;

e. passing said second portion of said principal fraction through said second zone of said principal stage, thus continuing with its regeneration;

f. lowering the pressure of said second portion down to the pressure of said secondary stage, thereby to flash off steam;

g. feeding said flashed steam into said secondary generation stage as stripping steam; and h. recycling said second portion to the top of said absorption stage.

14. The process of claim 13, wherein said scrubbing solution removed from said absorption stage is delivered entirely to said principal regeneration stage, passed through an upper portion of said principal stage, and subdivided into a secondary fraction which is removed and delivered to said secondary regeneration stage, and a principal fraction which goes on with its regeneration in said principal regeneration stage.

15. The process of claim 13, wherein said secondary fraction removed from said secondary stage and said first portion of the principal fraction removed at the bottom of said first zone of said principal stage are combined, cooled and delivered to an intermediate height to said absorption stage.

16. The process of claim 13, wherein said second portion removed from said second zone of said principal stage is cooled and delivered to the top of said absorption stage.

17. The process of claim 13, wherein the regenerated principal fraction of the solution is removed from said principal regeneration stage, brought to the pressure of said secondary regeneration stage, treated with a stream of inert gases to thus obtain a mixture of inert gases and steam, and the resulting mixture of inert gases and steam is then delivered to said secondary regeneration stage.

18. The process of claim 13, wherein said secondary fraction of said scrubbing solution is extracted from said absorption stage after passage in a upper zone used for the chemical absorption of said gaseous impurities and wherein the principal fraction of said scrubbing solution is extracted after passage in a lower zone of said absorption stage used for the physical absorption of the heat of the gaseous mixture entering said lower zone of said absorption stage.

19. In a process for removing gaseous impurities selected from the group consisting of $CO_2$, $H_2S$, HCN $SO_2$ from a gas mixture in an absorption stage by an aqueous alkaline scrubbing solution selected from the group consisting of an alkali metal carbonate solution, an alkali metal carbonate solution activated by $As_2O_3$, an alkali metal carbonate solution activated by glycine, an alkali metal carbonate solution activated by an aminoacid, an alkali metal carbonate solution activated by ethanolamine, an alkali metal carbonate solution activated by a salt of boric acid, a solution of an alkali metal salt of an amino acid, an ethanol amine solution, an alkali phosphate solution, an alkali phenate solution, an alkali borate solution, and an alkali sulfite/alkali bisulfite solution which is circulated between said absorption stage wherein said gas mixture is scrubbed with said solution and a regeneration stage wherein said scrubbing solution is regenerated with steam at substantially reduced pressure to desorb gaseous impurities therefrom, said regeneration stage actually consisting of two regeneration stages, respectively principal and secondary, the principal stage operating at a temperature and pressure higher than the secondary stage, and wherein said scrubbing solution is then recycled to said absorption stage, the improvement which comprises:

a. subdividing said secondary regeneration stage into two regeneration zones;

b. dividing said scrubbing solution from said absorption stage into two fractions, respectively principal and secondary, and delivering said principal fraction to said principal regeneration stage and said secondary fraction to said secondary regeneration stage;

c. regulating the pressure in said principal regeneration stage in order to establish a difference in temperature between the inlet scrubbing solution and the outlet scrubbing solution of from 10° to 35°C as a function of the amount of heat furnished from outside to said principal stage to thereby obtain a difference in temperature of from 5° to 10°C between the dew point of the gaseous mixture consisting of steam and desorbed gaseous impurities issuing from said principal stage, and the dew point of the gaseous mixture in equilibrium with the scrubbing solution entering said principal regeneration stage;

d. removing the principal fraction from said principal stage, delivering said principal fraction to an expansion zone, lowering the pressure of said principal fraction down to the pressure of the secondary stage, thereby flashing off steam, removing said principal fraction from said expansion zone and delivering it to the lower zone of said secondary stage;

e. removing the steam from said expansion zone, delivering it to the bottom of said lower zone of said secondary stage and passing it through said two zones of said secondary regeneration stage;

f. removing the solution issuing from said second zone of said secondary stage and delivering it to the top of said absorption stage; and g. removing the secondary fraction from said first zone of said secondary stage and delivering it to an intermediate height of said absorption stage.

20. The process of claim 19, wherein said scrubbing solution removed from said absorption stage is delivered entirely to said principal regeneration stage, passed through an upper portion of said principal stage, and subdivided into a secondary fraction which is removed and delivered to said secondary regeneration stage, and a principal fraction which continues with its regeneration in said principal regeneration stage.

21. The process of claim 19, wherein the solution removed from said lower zone of said secondary stage, is cooled and delivered to the top of said absorption stage.

22. The process of claim 19, wherein the solution removed from said first zone of said secondary stage is cooled and delivered to an intermediate height of said absorption stage, and the solution removed from the lower zone of said secondary stage is cooled and delivered to the top of said absorption stage.

23. The process of claim 19, wherein the regenerated principal fraction of the solution is removed from said principal regeneration stage, brought to the pressure of said secondary regeneration stage, treated with a stream of inert gases to thus obtain a mixture of inert gases and steam, and the resulting mixture of inert gases and steam is delivered to said secondary regeneration stage.

24. The process of claim 19, wherein said secondary fraction fo said scrubbing solution is extracted from said absorption stage after passage in a upper zone used for the chemical absorption of said gaseous impurities and wherein the principal fraction of said scrubbing solution is extracted after passage in a lower zone of said absorption stage used for the physical absorption of the heat of the gaseous mixture entering said lower zone of said absorption stage.

25. In a process for removing gaseous impurities selected from a group consisting of $CO_2$, $H_2S$, HCN and $SO_2$ from a mixture of gases by an absorption technique wherein an aqueous alkaline scrubbing solution selected from the group consisting of an alkali metal carbonate solution, an alkali metal carbonate solution activated by $As_2O_3$, an alkali metal carbonate solution activated by glycine, an alkali metal carbonate solution activated by an aminoacid, an alkali metal carbonate solution activated by ethanolamine, an alkali metal carbonate solution activated by a salt of boric acid, a solution of an alkali metal salt of an amino acid, an ethanol amine solution, an alkali phosphate solution, an alkali phenate solution, an alkali borate solution, and an alkali sulfite/alkali bisulfite solution is used to absorb said gaseous impurities from said mixture of gases in an absorption stage, and wherein said scrubbing solution is regenerated by being circulated to a regeneration stage wherein said gaseous impurities are desorbed from said scrubbing solution by contact with steam under reduced pressure, said regeneration stage actually consisting of two regeneration stages, respectively principal and secondary, the principal stage operating at a temperature and pressure higher than the secondary stage, and wherein said scrubbing solution is then recycled to said absorption stage, the improvement which comprises:

a. establishing in said absorption stage two absorption zones, respectively upper and lower, using said upper zone for the chemical absorption of said gaseous impurities and such lower zone for the physical absorption of the heat of the gaseous mixture entering said lower zone of said absorption zone;

b. delivering all said scrubbing solution to said upper zone, and dividing said scrubbing solution after passage in said upper zone into a principal and a secondary fraction;

c. removing said secondary fraction from said upper zone and delivering it to said secondary regeneration zone;

d. delivering said principal fraction to said lower zone, extracting said principal fraction from said lower zone and delivering it to said principal regeneration stage;

e. regulating the pressure in said principal regeneration stage in order to establish a difference in temperature between the inlet scrubbing solution and the outlet scrubbing solution of from 10° to 35°C as a function of the amount of heat furnished from outside to said principal regeneration stage to thereby obtain a difference in temperature of from 5° to 10°C between the dew point of the gaseous mixture consisting of steam and desorbed gaseous impurities issuing from said principal regeneration stage, and the dew point of the gaseous mixture in equilibrium with said scrubbing solution entering said principal regeneration stage;

f. withdrawing from said principal regeneration stage the regenerated principal scrubbing solution, and lowering the pressure of said regenerated principal scrubbing solution to thereby flash off steam;

g. feeding said flashed off steam of (f) to said secondary regeneration stage as stripping steam; and h. withdrawing regenerated secondary scrubbing solution from said secondary regeneration stage, combining said regenerated secondary scrubbing solution with said regeneration principal scrubbing solution of (g), and recycling said combined solutions to said absorption stage.

26. The process of claim 25, wherein said absorption stage is in the form of an absorption column having a top and a bottom, and wherein said combined solutions in (h) are recycled to the top of said column.

27. The process of claim 25, wherein said absorption stage is in the form of an absorption column having a top and a bottom, and wherein instead of combining said regenerated principal and secondary scrubbing solutions in (h), said principal regenerated scrubbing solution from (g) is cooled and recycled to the top of said absorption column, and said secondary scrubbing solution withdrawn from said secondary regeneration stage is recycled to said absorption column intermediate the top and bottom thereof.

* * * * *